(12) United States Patent
Escudero Rodriguez et al.

(10) Patent No.: US 11,953,971 B2
(45) Date of Patent: Apr. 9, 2024

(54) METHOD FOR EXTENDING HOLD-UP TIME

(71) Applicant: Infineon Technologies Austria AG, Villach (AT)

(72) Inventors: Manuel Escudero Rodriguez, Villach (AT); David Meneses Herrera, Helsinki (FI); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 23 days.

(21) Appl. No.: 17/835,520

(22) Filed: Jun. 8, 2022

(65) Prior Publication Data

US 2022/0404896 A1    Dec. 22, 2022

(30) Foreign Application Priority Data

Jun. 21, 2021    (EP) .................................... 21180669

(51) Int. Cl.
  *G06F 1/3296*    (2019.01)
  *G06F 1/3287*    (2019.01)
  *H02J 7/34*    (2006.01)

(52) U.S. Cl.
  CPC .......... *G06F 1/3296* (2013.01); *G06F 1/3287* (2013.01); *H02J 7/345* (2013.01)

(58) Field of Classification Search
  CPC ...... G06F 1/3296; G06F 1/3287; H02J 7/345; H02J 7/342; H02M 1/0096; H02M 1/348
  USPC ......................................................... 327/108
  See application file for complete search history.

(56) References Cited

U.S. PATENT DOCUMENTS

| 6,504,497 | B2 | 1/2003 | Jang et al. | |
| 10,411,591 | B2 | 9/2019 | Fu et al. | |
| 11,139,754 | B1 * | 10/2021 | Shi | H02M 1/0054 |
| 2016/0322916 | A1 * | 11/2016 | Hao | H02M 7/483 |

(Continued)

FOREIGN PATENT DOCUMENTS

| EP | 0945968 A2 | 9/1999 |
| EP | 1001514 A2 | 5/2000 |

(Continued)

OTHER PUBLICATIONS

Baek, Jaeil, et al., "A "Reverse-Feeding" Hold-up Time Strategy for Two-Stage Grid-Interface PFC with a Rectifier-Coupled Boost Inductor", IEEE Energy Conversion Congress & Expo, Baltimore, MD, Sep. 29-Oct. 3, 2019, pp. 1-20.

(Continued)

*Primary Examiner* — Ryan Jager
(74) *Attorney, Agent, or Firm* — Murphy, Bilak & Homiller, PLLC

(57) ABSTRACT

Disclosed is a method and a control circuit. The method includes operating a buffer circuit in a first operating mode or a second operating mode. Operating the buffer circuit in the first operating mode includes buffering, by a first capacitor of the buffer circuit, power provided by a power source and received by a load. Operating the buffer circuit in the second operating mode includes connecting a second capacitor in series with the first capacitor to form a capacitor series circuit, supplying power to the load by the capacitor series circuit, and regulating a first voltage across the capacitor series circuit. Regulating the first voltage includes transferring charge from the first capacitor to the second capacitor.

17 Claims, 14 Drawing Sheets

(56) References Cited

U.S. PATENT DOCUMENTS

| | | |
|---|---|---|
| 2017/0317594 A1 | 11/2017 | Lind |
| 2020/0209902 A1 | 7/2020 | Elias-Palacios |
| 2020/0321796 A1* | 10/2020 | Chang .................... H02M 1/10 |
| 2022/0404896 A1* | 12/2022 | Escudero Rodriguez ................... H02M 1/0096 |
| 2022/0407405 A1* | 12/2022 | Escudero Rodriguez ................... H02M 3/1588 |

FOREIGN PATENT DOCUMENTS

| | | |
|---|---|---|
| EP | 0945968 A3 | 12/2001 |
| EP | 1001414 A3 | 4/2002 |

OTHER PUBLICATIONS

Jang, Yungtaek, et al., "Hold-Up Time Extension Circuit with Integrated Magnetics", IEEE Transactions on Power Electronics, vol. 21, Issue: 2, Mar. 2006, pp. 219-225.

Xing, Yan, et al., "A Combined Front End DC/DC Converter", IEEE, 2003, pp. 1095-1099.

Neumayr, Dominik, et al., "Comparative Evaluation of a Full- and Partial-Power Processing Active Power Buffer for Ultra-Compact Single-Phase DC/AC Converter Systems", IEEE Journal of Emerging and Selected Topics in Power Electronics, vol. 9, No. 2, doi: 10.1109/JESTPE.2020.2987937., Apr. 2021, pp. 1-21.

\* cited by examiner

METHOD FOR EXTENDING HOLD-UP TIME

TECHNICAL FIELD

This disclosure relates in general to a method for extending the hold-up time.

BACKGROUND

In many types of electronic circuits, a capacitor is connected between input nodes of an electronic load, wherein the input nodes are configured to be connected to output nodes of a power source. The capacitor serves (a) to filter ripples in a power provided by the power source, and (b) to provide sufficient power to the load for a certain time period when the power source fails. This time period is usually referred to as hold-up time. Supplying power to the load during an outage of the power source, that is, during the hold-up time, causes the capacitor to be discharged. Discharging the capacitor has the effect that a voltage level of a voltage across the capacitor falls below a nominal voltage level, which is a voltage level adjusted by the power source in a normal operating mode.

The capacitance of the capacitor that is required to supply the load during the hold-up time is dependent on the duration of the hold-up time, the power consumption of the load, and a minimum voltage level. The "minimum voltage level" is the voltage level the voltage across the capacitor should not undershoot in order to maintain a proper operation of the load. Basically, the longer the hold-up time, the higher the power consumption of the load, or the smaller a difference between the nominal voltage level and the minimum voltage level, the larger the required capacitance.

SUMMARY

The size of a capacitor is related to its capacitance, wherein the higher the capacitance the greater the size. It is desirable to reduce the size of the capacitor without reducing the hold-up time or to increase the hold-up time without increasing a capacitance.

One example relates to a method. The method includes operating a buffer circuit in a first operating mode or a second operating mode. Operating the buffer circuit in the first operating mode includes buffering, by a first capacitor of the buffer circuit, power provided by a power source and received by a load. Operating the buffer circuit in the second operating mode includes connecting a second capacitor in series with the first capacitor to form a capacitor series circuit, supplying power to the load by the capacitor series circuit, and regulating a first voltage across the capacitor series circuit, wherein regulating the first voltage includes transferring charge from the first capacitor to the second capacitor.

Another example relates to a control circuit that is configured to operate a buffer circuit in a first operating mode or a second operating mode. Operating the buffer circuit in the first operating mode includes buffering, by a first capacitor of the buffer circuit, power provided by a power source and received by a load. Operating the buffer circuit in the second operating mode includes connecting a second capacitor in series with the first capacitor to form a capacitor series circuit, supplying power to the load by the capacitor series circuit, and regulating a first voltage across the capacitor series circuit, wherein regulating the first voltage includes transferring charge from the first capacitor to the second capacitor.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
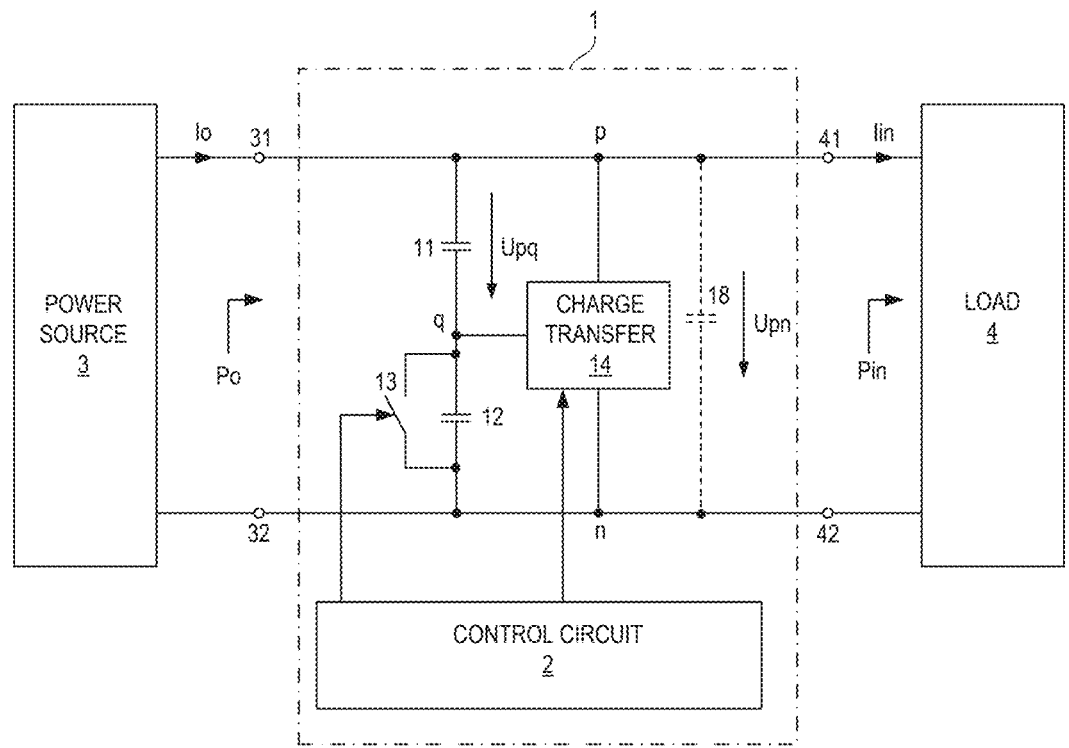
FIG. 1 shows a buffer circuit configured to be connected to a power source and a load, according to one example.

FIG. 1 illustrates one example of a buffer circuit 1 that is configured to be connected to an output of a power source 3 and an input of a load 4. More specifically, in the example shown in FIG. 1, the buffer circuit 1 includes a first circuit node p that is configured to be connected to a first output node 31 of the power source 3 and a first input node 41 of the load 4, and a second circuit node n that is configured to be connected to a second output node 32 of the power source 3 and a second input node 42 of the load 4. The buffer circuit 1 includes a first capacitor 11 and a second capacitor 12 and is configured to operate in a first operating mode or a second operating mode.

Figure 2:
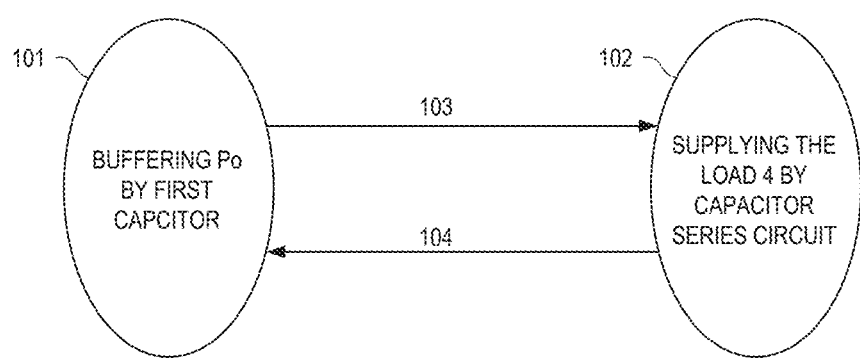
FIG. 2 shows a state diagram that illustrates operating the buffer circuit in a first operating mode and a second operating mode.

Referring to FIG. 2, which schematically illustrates a state diagram of the buffer circuit 1, operating the buffer circuit 1 in the first operating includes buffering an output power Po provided by the power source 3 by a first capacitor 11 of the buffer circuit 1.

Referring to FIG. 1, the load 4 is configured to receive an input power Pin at the input nodes 41, 42, wherein the input power is given by a current Iin received by the load multiplied with a first voltage Upn, which is a voltage between the first circuit node p and the second circuit node n of the buffer circuit 1 and between the first input node 41 and the second input node 42 of the load. The power source 3 may be configured to generate the output power Po such that, in the first operating mode, an average of the output power Po essentially equals the input power Pin received by the load 4, wherein the instantaneous output power may vary over the time. One example of a timely varying output power Po is explained in detail herein further below.

"Buffering the output power Po by the first capacitor 11", in the first operating mode, includes storing energy in the first capacitor 11 when the output power Po is higher than the input power Pin, and providing energy by the first capacitor 11 to the load 4 when the output power Po is lower than the input power Pin. In the first operating mode, the first voltage Upn between the first circuit node p and the second circuit node n is regulated by the power source 3, for example. One example of a power source 3 that is configured to regulate the first voltage Upn is explained in detail herein further below. In the first operating mode, the load 4 is essentially supplied by the power source 3, wherein the buffer circuit 1, in this operating mode, only serves to buffer variations in the output power Po provided by the power source 3.

Referring to FIG. 2, operating the buffer circuit 1 in the second operating mode includes supplying the load 4 by a capacitor series circuit and regulating the first voltage Upn. The capacitor series circuit includes the first capacitor 11 and a second capacitor 12 connected in series with the first capacitor 11, wherein the capacitor series circuit is connected between the first circuit node p and the second circuit n, so that, in the second operating mode, the first voltage Upn is the voltage across the capacitor series circuit. Regulating the first voltage Upn includes transferring charge from the first capacitor 11 to the second capacitor 12. According to one example, the buffer circuit 1 operates in the second operating mode when a power flow from the power source 3 is interrupted, that is, when the output power Po provided by the power source 3 is zero. This is explained in detail herein further below.

In the second operating mode, the buffer circuit 1, based on energy stored in the first capacitor 11 generates the first voltage Upn received by the load 4. More specifically, the first capacitor 11 serves as a power source that provides the energy to the second capacitor 12 and the load 4 that is required to maintain the first voltage Upn at a predefined voltage level required by the load 4. A time period in which the buffer circuit 1 operates in the second operating mode may be referred to as hold-up time.

Figure 3A:
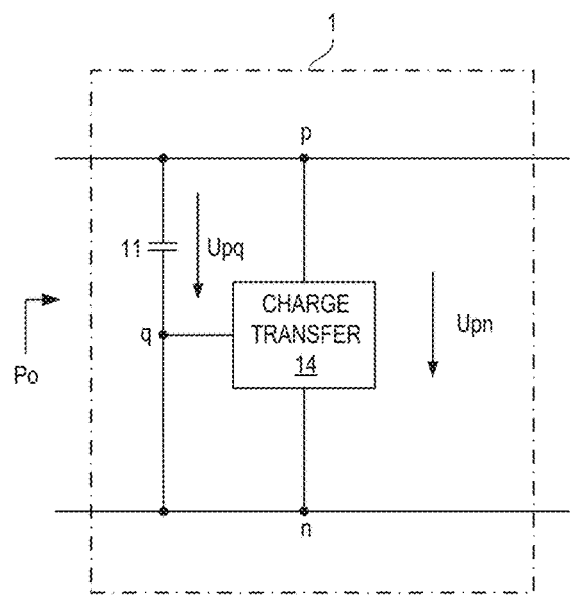
FIG. 3A shows an equivalent circuit diagram of the buffer circuit in the first operating mode.

Referring to the above, the capacitor series circuit is connected between the first circuit node p and the second circuit node n. Furthermore, referring to FIG. 1, an electronic switch may be connected in parallel with the second capacitor 12. In this example, operating the buffer circuit 1 in the first operating mode includes switching on the electronic switch 13 by a control circuit 2, so that the first capacitor 11 is electrically connected between the first circuit node p and the second circuit node n and the second capacitor 12 is short-circuited. An equivalent circuit diagram of the buffer circuit 1 in the first operating mode is illustrated in FIG. 3A.

Referring to FIG. 1, the first capacitor 11 is connected between the first circuit node p and a third circuit node q, and the electronic switch 13 and the second capacitor 12 are connected between the third circuit node q and the second circuit node n. In the circuit diagram according to FIG. 3A, the electrical connection between the third circuit node q and the second circuit node n represents the switched-on (closed) switch 13 and the short-circuited second capacitor 12 in the first operating mode.

Figure 3B:
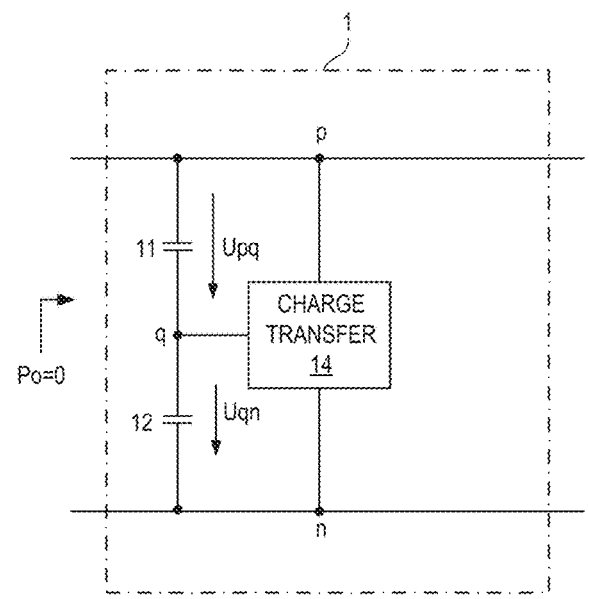
FIG. 3B illustrates an equivalent circuit diagram of the buffer circuit in the second operating mode.

In the second operating mode, the control circuit 2 switches off the electronic switch 13, so that the second capacitor 12 is electrically connected between the third circuit node q and the second circuit n. An equivalent circuit diagram of the buffer circuit 1 in the second operating mode is illustrated in FIG. 3B.

Referring to FIG. 1, the buffer circuit 1 further includes a charge transfer circuit 14. The charge transfer circuit 14 is configured, in the second operating mode, to transfer charge (electrical energy) from the first capacitor 11 to the second capacitor 12 in order to regulate the first voltage Upn. In the example shown in FIG. 1, the charge transfer circuit 14 is connected to the first circuit node p, the second circuit node n and the third circuit node q of the buffer circuit 1. The control circuit 2, in addition to controlling the electronic switch 13, is configured to activate and deactivate the charge transfer circuit 14. More specifically, the control circuit 2 is configured to activate the charge transfer circuit 14 in the second operating mode and deactivate the charge transfer circuit 14 in the first operating mode.

Figure 4:
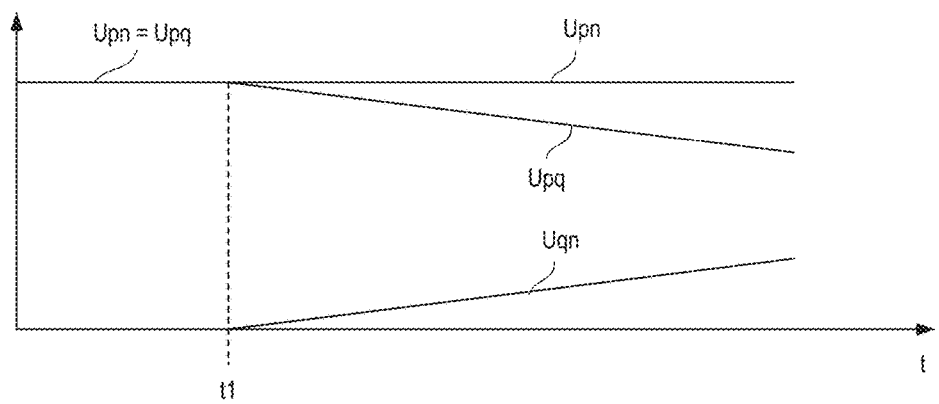
FIG. 4 shows signal diagrams that illustrate operating the buffer circuit in the first operating mode and the second operating mode.

FIG. 4 shows a signal diagram that schematically illustrates operating the buffer circuit 1 in the first operating mode and the second operating mode. Before a first time instance t1 illustrated in FIG. 4, the buffer circuit 1 operates in the first operating mode. In this operating mode, the first capacitor 11 is directly connected between the first and second circuit nodes p, n, so that the first voltage Upn between the first circuit node p and the second circuit node n essentially equals a second voltage Upq, which is a voltage across the first capacitor 11.

After the first time instance t1, the buffer circuit 1 operates in the second operating mode. Referring to the above, in this operating mode, the first capacitor 11 is discharged and the first voltage Upn is regulated by the charge transfer circuit 14. For regulating the first voltage Upn charge is transferred from the first capacitor 11 to the second capacitor 12, so that the second voltage Upq decreases and a third voltage Uqn across the second capacitor 12 increases, wherein Upn=Upq+Uqn.

Referring to the above, the first voltage Upn is regulated by the power source 3 in the first operating mode and is regulated by the charge transfer circuit 14 in the second operating mode. According to one example, the voltage level of the first voltage Upn is essentially the same in the first operating mode and the second operating mode, as illustrated in FIG. 4. This, however, is only an example. According to another example, the voltage level of the first voltage Upn is lower in the second operating mode than in the first operating mode. According to one example, the voltage level of the first voltage Upn in the second operating mode is between 90% and 100% of the voltage level of the first voltage Upn in the first operating mode. According to another example, the voltage level of the first voltage Upn in the second operating mode is between 3V and 30V lower than the voltage level of the first voltage Upn in the first operating mode.

Referring to the above, in the first operating mode, the output power Po provided by the power source 3 may vary over the time. Such variation of the output power Po may result in a variation of the first voltage Upn. Such variations, however, are not illustrated in FIG. 4.

As can be seen from FIG. 4, in the second operating mode (that is, during the hold-up time), the second voltage Upq decreases while the first voltage Upn is maintained at a predefined voltage level that is higher than the voltage level of the second voltage Upq. While it is desirable to maintain the first voltage Upn at a desired voltage level $Upn_0$ that is required to ensure a proper operation of the load 4 the second voltage Upq may fall significantly below this voltage level $Upn_0$ According to one example, during the hold-up time the first capacitor may be discharged until the second voltage Upq reaches 50% or even less of the desired voltage level $Upn_0$.

According to one example, a capacitance C12 of the second capacitor 12 is significantly lower than a capacitance of the first capacitor C11. According to one example, the capacitance C12 of the second capacitor 12 is less than 20%, less than 10%, less than 5%, or even less than 3% of the capacitance of the first capacitor 11. In the second operating mode, the first capacitor 11 serves as an energy storage for providing energy to the load 4. Providing energy to the load 4 causes the second voltage Upq. In the second operating mode, the first capacitor 11 therefore also provides energy to the second capacitor 12 in such a way that the second capacitor 12 compensates for the decrease of the second voltage Upq and the first voltage Upn is essentially constant.

The capacitance of the first capacitor 11 is, for example, selected dependent on the (maximum) input power (the power consumption) Pin of the load 4, and a maximum duration of the hold-up time. The energy $E_{hu}$ received by the load 4 during the hold-up-time is given by the (maximum) input power Pin multiplied with the duration Thu of the hold-up time. Based on this, the capacitance C11 of the first capacitor 11 is selected based on $$C11 > \frac{2 \cdot E_{hu}}{Upq_o^2 - Upq_{min}^2}, \quad (1)$$

where C11 is the minimum required capacitance of the first capacitor, $E_{hu}$ is the energy received by the load during the hold-up time, $Upq_0$ the voltage across the first capacitor 11 at the beginning of the hold-up time and equals $Upn_0$, and $Upq_{min}$ is the minimum desired voltage across the first capacitor 11. During the hold-up time, the second capacitor 12 may be charged such that, at the end of the hold-up time, the voltage across the second capacitor equals $Upn_0 - Upg_{min}$.

As can be seen from equation (1), the larger the energy required during the hold-up time the higher the required capacitance. Furthermore, the lower the minimum voltage $Upq_{min}$, that is, the more the first capacitor 11 is allowed to be discharged during the hold-up time, the smaller the required capacitance C11. Referring to the above $Upq_{min}$ is 50% of $Upn_0$, for example.

In a conventional buffer circuit (not shown) that only includes one capacitor, the energy received by the load during the hold-up time is provided by the one capacitor. Considering that the voltage across the capacitor should not fall below 80% or 75% of the desired voltage, the capacitance of this capacitor is significantly higher than the capacitance of the first capacitor.

In a conventional system, for example, in which an input power of the load is 3.3 kW, a desired input voltage of the load is 400V, and the input voltage is allowed to drop to 320V (80% of 400V) during the hold-up time, a capacitor with a capacitance of about 2.3 millifarads (mF) is required to satisfy the power consumption of the load for a certain hold-up time. When the input voltage is allowed to drop not lower than 360V (90% of 400V) a capacitance of 4.3 mV is required to satisfy the power consumption of the load for the same hold-up time. In the system according to FIG. 1, to supply the same load for the same hold-up time as in the conventional system, a capacitance C11 of the first capacitor 11 of only 1.1 mF is required in order to maintain the first voltage Upn at 400V during the hold-up time, wherein the voltage Upq across the first capacitor 11 is allowed to drop to 200V (50% of 400V). Referring to the above, the capacitance C12 of the second capacitor 12 is significantly lower than the capacitance C11 of the first capacitor 11, so that an overall capacitance of the buffer circuit 1 according to FIG. 1 is significantly lower than the capacitance of the capacitor in the conventional system.

Figure 5:
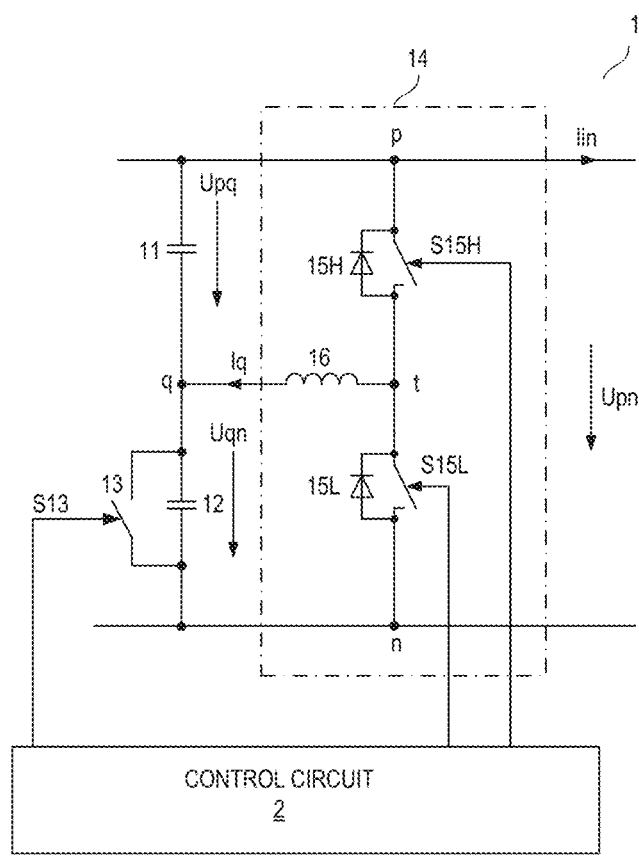
FIG. 5 shows a charge transfer circuit of the buffer circuit, according to one example.

FIG. 5 shows one example of the charge transfer circuit 14 that is configured to transfer charge from the first capacitor 11 to the second capacitor 12 in order to regulate the first voltage Upn. This charge transfer circuit 14 includes a half-bridge with a high-side switch 15H and a low-side switch 15L, wherein these switches 15H, 15L are connected in series between the first circuit node p and the second circuit node n. The high-side switch 15H switches on or off dependent on a high-side drive signal S15H received from the control circuit 2, and the low-side switch 15L switches on or off dependent on a low-side drive signal S15L received from the control circuit 2. Furthermore, the charge transfer circuit 14 includes an inductor 16 connected between a tap t of the half-bridge and the third circuit node q. The tap t of the half-bridge is a circuit node at which the high-side switch 15H and the low-side switch 15L are connected.

Referring to FIG. 5, each of the high-side switch 15H and the low-side switch 15L includes a freewheeling element, so that each of the high-side switch S15H and the low-side switch S15L is capable of blocking, in the off-state, only when a respective voltage across the respective switch 15H, 15L has a first polarity, while the freewheeling element conducts when the voltage has a second polarity opposite the first polarity. In the example shown in FIG. 5, the high-side switch 15H and the low-side switch 15L are implemented such that the freewheeling element of the high-side switch 15H conducts whenever an electrical potential at the tap t is higher than the electrical potential at the first circuit node p. Equivalently, the freewheeling element of the low-side switch 15L conducts whenever the electrical potential at the second circuit node n is higher than the electrical potential at the tap t.

Just for the purpose of illustration, the freewheeling elements are drawn as pn-diodes in the example shown in FIG. 5. This, however, is only an example. The freewheeling elements may also be implemented as Schottky diodes or the like.

Each of the high-side switch 15H and the low-side switch 15L may be implemented as a conventional electronic switch with a parallel freewheeling element. According to one example, each of the high-side switch 15H and the low-side switch 15L includes a transistor such as, for example, a MOSFET (Metal Oxide Semiconductor Field-Effect Transistor), a HEMT (High Electron-Mobility Transistor), an IGBT (Insulated Gate Bipolar Transistor), or the like. The freewheeling element may be a circuit element in addition to the transistor, or may be an integral part of the respective transistor. If the transistor is a MOSFET, for example, the freewheeling element may be formed by the respective body diode of the MOSFET.

Unless stated otherwise, everything explained with regard to the implementation of the high-side switch 15H and the low-side switch 15L applies to the implementation of the electronic switch 13 connected in series with the first capacitor 11, and also applies to each of the electronic switches explained herein further below. It should be noted that different types of electronic switches may be used in the buffer circuit. That is, the first switch 13 may be implemented using a first type of electronic switch and the high-side switch 15H and the low-side switch 15L may be implemented using a second type of electronic switch.

Figure 6:
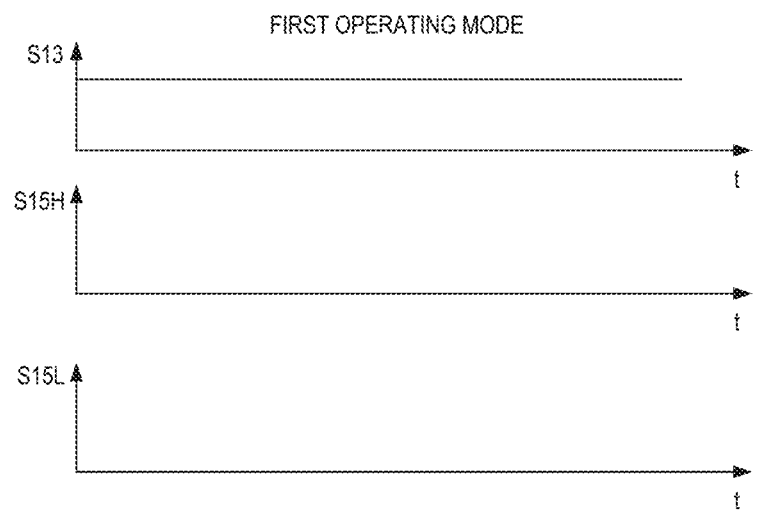
FIG. 6 shows signal diagrams that illustrate operating the charge transfer circuit in the first operating mode of the buffer circuit.
Figure 7:
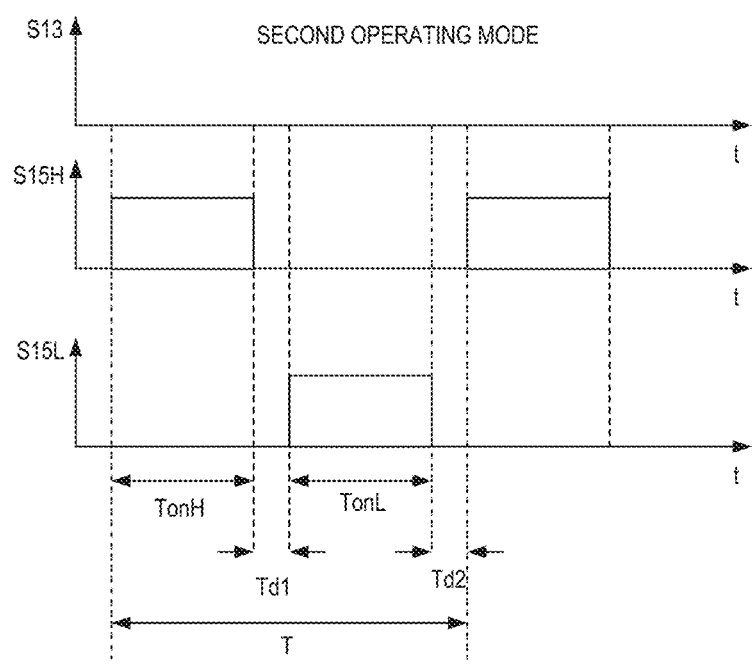
FIG. 7 shows signal diagrams that illustrate operating the charge transfer circuit in the second operating mode of the buffer circuit.

FIG. 6 shows signal diagrams that schematically illustrate operating the buffer circuit 1 in the first operating mode, and FIG. 7 shows signal diagrams that schematically illustrate operating the buffer circuit 1 in the second operating mode. More specifically, each of FIGS. 6 and 7 illustrates signal diagrams of the drive signal S13 received by the electronic switch 13, and signal diagrams of the high-side drive signal S15H and the low-side drive signal S15L received by the high-side switch 15H and the low-side switch 15L, respectively. Each of these signals either has an on-level that switches on the respective switch or an off-level that switches off the respective switch. Just for the purpose of illustration, the on-level is a high signal level and the off-level is a low signal level in the examples illustrated in FIGS. 6 and 7.

Referring to FIG. 6, in the first operating mode, the control circuit 2 switches on the electronic switch 13 by generating an on-level of the switch drive signal S13. Furthermore, the control circuit 2 maintains the high-side switch 15H and the low-side switch 15L in the off-state throughout the first operating mode in order to deactivate the charge transfer circuit. That is, the high-side drive signal S15H and the low-side drive signal S15L each have an off-level throughout the first operating mode.

Referring to FIG. 7, in the second operating mode, the control circuit 2 maintains the electronic switch 13 in the off-state and operates the high-side switch 15H and the low-side switch 15L in a PWM (pulse-width modulated) fashion in order to regulate the first voltage Upn. Operating the high-side switch 15H and the low-side switch 15L in a PWM fashion includes operating the high-side switch 15H and the low-side switch 15L in a plurality of successive drive cycles such that the high-side switch 15H switches on for a first on-time TonH and the low-side switch 15L switches on for a second on-time TonL in each drive cycle, wherein only one of the high-side switch 15H and the low-side switch 15L is switched on at the same time. In order to avoid a cross current in the half-bridge 15H, 15L, there may be a first dead time Td1 between switching off the high-side switch 15H and switching on the low-side switch 15L and a second dead time Td2 between switching off the low-side switch 15L and switching on the high-side switch 15H.

Each drive cycle has a certain duration T, which is given by the first on-time TonH, the second on-time TonL, the first dead time Td1, and the second dead time Td2. A switching frequency fsw is given by the reciprocal of the duration T of one drive cycle. As will be explained in detail herein further below, the first and second on-times TonH, TonL, but also the duration T of the individual drive cycles may vary dependent on the type of regulation scheme used to regulate the first voltage Upn in the second operating mode.

Operation of the charge transfer circuit 14 during one drive cycle is explained with reference to FIGS. 5 and 7 in the following. Whenever the high-side switch 15H switches on, a current flows from the first capacitor 11 via the high-side switch 15H and the inductor 16, so that energy is transferred from the first capacitor 11 to the inductor 16. When the high-side switch 15H switches off and the low-side switch 15L switches on, a current Iq through the inductor 16 continuous to flow, wherein the current flows via the second capacitor 12 and the low-side switch 15L, so that energy is transferred from the inductor 16 to the second capacitor 12. During the first dead time Td1 between switching off the high-side switch 15H and switching on the low-side switch 15L, the current Iq flows via the freewheeling element of the low-side switch 15L.

The current Iq increases when the high-side switch 15H is switched on and decreases when the low-side switch 15L is switched on. Dependent on the regulation scheme, the low-side switch 15L may switch off before the current Iq has decreased to zero. In this case, the freewheeling element of the low-side switch 15L takes over the current Iq before the high-side switch 15H switches on.

In each case, by suitably adjusting durations of the first and second on times TonH, TonL the average inductor current Iq and, therefore, the first voltage Upn can be regulated. This is explained in detail herein further below.

When the load 4 (not shown in FIG. 5) receives an input current Iin from the capacitor series circuit, the input current Iin is drawn from the first capacitor 11 and the second capacitor 12. Basically, in order to compensate for the current that flows from the second capacitor 12 via the first capacitor 11 to the load and to regulate the first voltage Upn to be essentially constant, an average of the inductor current Iq flowing from the inductor 16 into the second capacitor 12 during the off-time of the high-side switch 15H is given by the input current Iin plus a current required to increase the third voltage Uqn.

Figure 8:
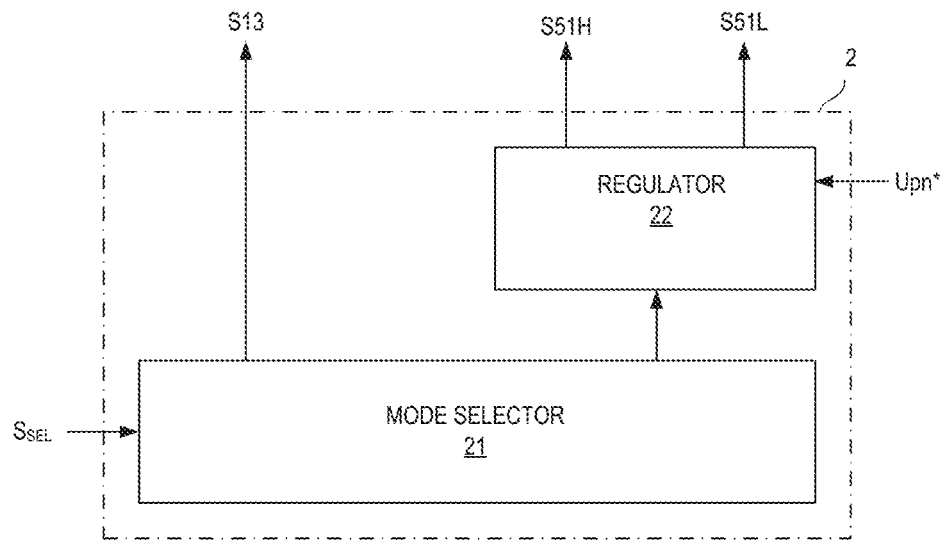
FIG. 8 shows a block diagram of a control circuit of the buffer circuit according to one example.
Figure 9:
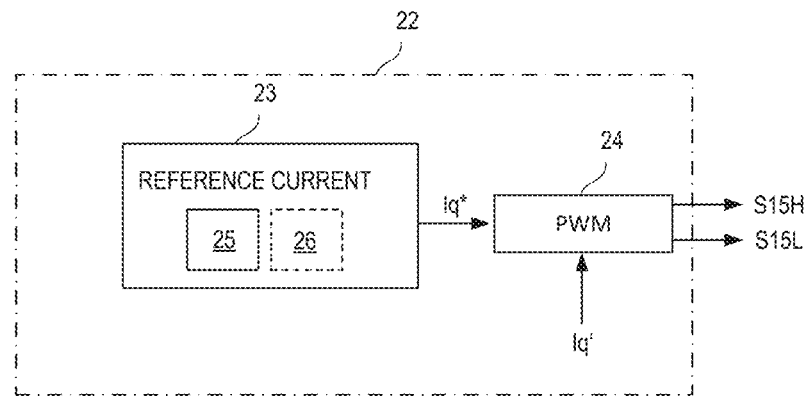
FIG. 9 shows a block diagram of one example of a regulator included in the control circuit according to FIG. 8.

FIG. 8 shows a block diagram of the control circuit 2 and FIG. 9 shows a block diagram of one detail of the control circuit 2. It should be noted that these block diagrams illustrate functional blocks rather than a specific implementation. Those functional blocks can be implemented in various ways. According to one example, these functional blocks are implemented using dedicated circuitry. According to another example, the functional blocks are is implemented using hardware and software. For example, the control circuit 2 includes a microcontroller and software executed by the microcontroller.

Referring to FIG. 8, the control circuit 2 may include a mode selector 21 which receives a select signal $S_{SEL}$. This select signal $S_{SEL}$ may be any kind of signal that is suitable for the mode selector 21 to decide whether to operate the buffer circuit 1 in the first operating mode or the second operating mode. In the example shown in FIG. 8, the mode selector 21 generates the drive signal S13 received by the electronic switch 13. Furthermore, the control circuit 2 includes a regulator 22 which controls operation of the charge transfer circuit 14 by generating the high-side drive signal S51H and the low-side drive signal S51L in order to regulate the first voltage Upn. According to one example, the regulator 22 at least receives a measured first voltage Upn' and a first voltage reference Upn*. The measured first voltage Upn' is a signal representing the first voltage Upn. The measured first voltage Upn' may be generated using any type of voltage measurement circuit that is suitable to measure the first voltage Upn between the first circuit node p and the second circuit node n. Such voltage measurement circuits are commonly known, so that no further explanation is required in this regard. The first voltage reference Upn* represents the desired voltage level (such as $Upn_0$ explained above) of the first voltage Upn in the second operating mode.

FIG. 9 shows a block diagram of the regulator 22 illustrated in FIG. 8. Referring to FIG. 9, the regulator includes a reference current controller 23 that is configured to output a current reference Iq*, wherein the current reference Iq* represents a desired average current level of the current Iq through the inductor 16 in the charge transfer circuit 14. This current Iq is also referred to as inductor current in the following. Equivalently, the current reference Iq* is referred to as inductor current reference in the following.

Referring to FIG. 9, a pulse-width modulation (PWM) circuit 24 receives the inductor current reference Iq* and a measured inductor current Iq' and is configured to generate the high-side drive signal S15H and the low-side drive signal S15L dependent on the inductor current reference Iq* and the measured inductor current Iq' such that the average of the inductor current Iq is defined by the inductor current reference Iq*. The "average" of the inductor current Iq includes an average of the inductor current Iq over at least one drive cycle of the half-bridge 15H, 15L in the charge transfer circuit 14. The measured inductor current Iq' is a signal that represents the inductor current Iq and may be obtained using any kind of current measurement circuit that is suitable to measure the inductor current Iq. Such current measurement circuits are commonly known, so that no further explanation is required in this regard.

The reference current controller 23 includes at least one control loop 25 that is configured to generate the output current reference Iq* in the second operating mode. The first control loop 25 is configured to generate the output current reference Iq* such that the first voltage Upn is regulated in such a way that its voltage level essentially equals a voltage level represented by the first voltage reference Upn*. One example of the first control loop 25 is illustrated in FIG. 10.

Figure 10:
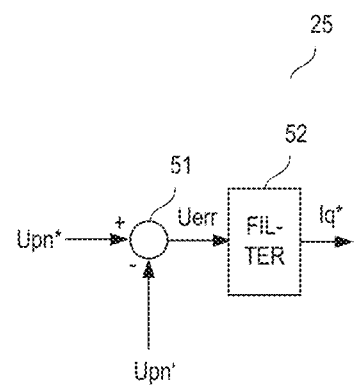
FIG. 10 shows one example of a reference current controller included in the regulator according to FIG. 9.

The control loop 25 shown in FIG. 10 includes a subtractor 51 that receives the first voltage reference Upn* and the measured first voltage Upn' and outputs an error signal Uerr. A filter 52 receives the error signal Uerr and generates the inductor current reference Iq* based on the error signal Uerr. The filter may have one of a P-characteristic, a PI-characteristic, or a PID-characteristic (wherein P means proportional, I means integrative, and D means derivative).

The PWM circuit 24 that is configured to receive the inductor current reference Iq* and the measured inductor current Iq' and to generate the high-side drive signal S15H and the low-side drive signal S15L may be implemented in various ways. This is explained with reference to FIGS. 11A-11E. Each of these figures shows timing diagrams of the measured inductor current Iq', which represents the inductor current Iq, over several drive cycles of the PWM circuit 24 and illustrates one possible operating principle of the PWM circuit 24.

According to one example, the PWM circuit 24 operates as a hysteretic controller. In this case, the PWM circuit 24 calculates an upper current threshold Iqh and a lower current threshold Iql based on the output current reference Iq* and operates the high-side switch 15H and the low-side switch 15L such that the inductor current Iq oscillates between the upper current threshold Iqh and the lower current threshold Iql.

Figure 11A:
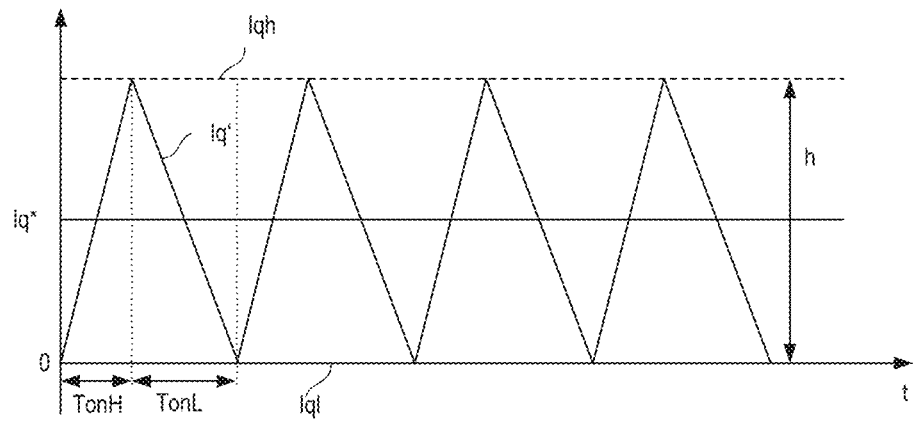
FIGS. 11A to 11E show signal diagrams that illustrate different operating modes of the charge transfer circuit in the second operating mode.
Figure 11B:
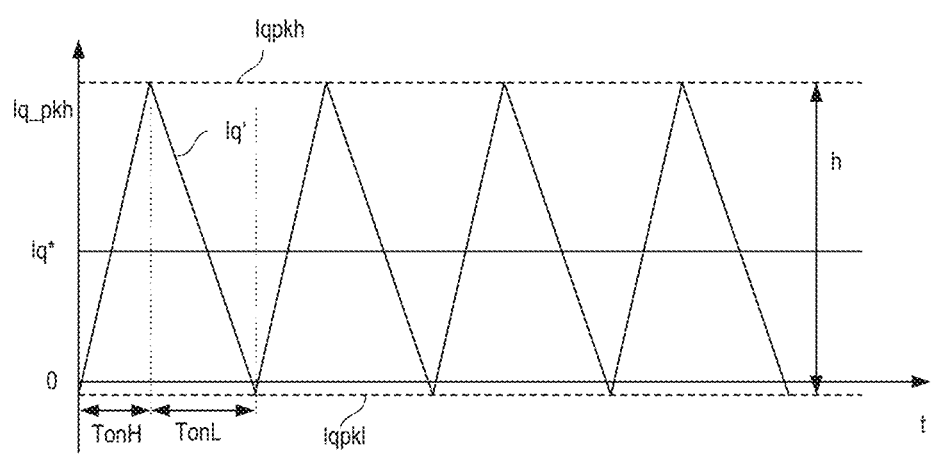
Figure 11C:
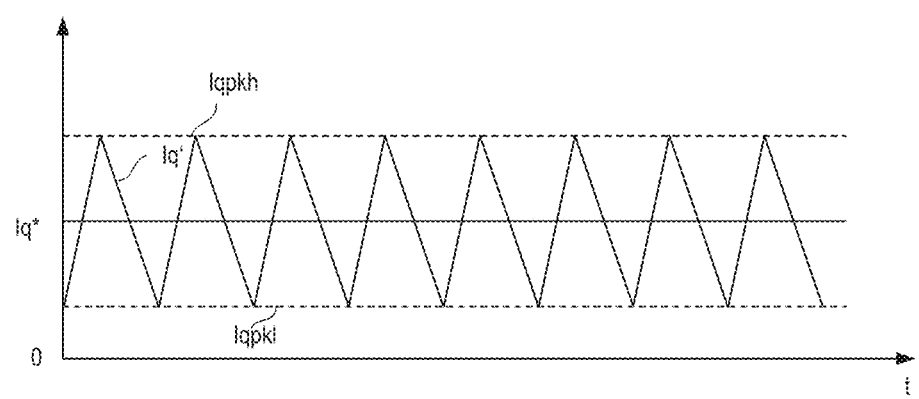

FIGS. 11A-11C show signal diagrams that illustrate the operating principle of a PWM circuit 24 operating as a hysteretic controller. Each of these FIGS. 11A-11C schematically illustrate timing diagrams of the output current reference Iq*, the upper current threshold Iqh, the lower current threshold Iql and the measured inductor current Iq'. In each case, the upper current threshold Iqh and the lower current threshold Iql are symmetrical relative to the output current reference Iq*, so that $$Iq^* = Iql + \frac{Iqh - Iql}{2} = \frac{Iqh + Iql}{2}. \tag{2}$$

A hysteresis h is given by $$h = Iqh - Iql \tag{3}.$$

Referring to FIGS. 11A to 11C, the inductor current Iq, which is represented by the measured inductor current Iq' in FIGS. 11A to 11C, has an essentially triangular current waveform, so that the average inductor current essentially equals the output current reference Iq* when the inductor current oscillates between the upper current threshold Iqh and the lower current threshold Iql.

In each case, the PWM circuit 24 switches on the high-side switch 15H when the measured inductor current Iq' reaches the lower current threshold Iql, so that the inductor current increases. Whenever the measured inductor current Iq' reaches the upper current threshold Iqh, PWM circuit 24 switches off the high-side switch 15H and switches on the low-side switch 15L, so that the inductor current decreases. The first and second on-times TonH, TonL are also illustrated in FIGS. 11A to 11C, wherein, for the ease of illustration, the dead times are not illustrated. During the first dead time Td1, which is between switching off the high-side switch 15H and switching on the low-side switch 15L, the inductor current Iq flows via the rectifying element of the low-side switch 15L, so that the inductor current already decreases. During the second dead time Td2, which is between switching off the low-side switch 15L and switching on the high-side switch 15H, the inductor current may continue to flow via the freewheeling element of the low-side switch 15L.

Referring to FIGS. 11A to 11C, the upper current threshold Iqh and the lower current threshold Iql may be selected in various ways. According to one example, illustrated in FIG. 11A, the lower current threshold Iql is zero and the upper current threshold Iqh is adjusted dependent on the output current reference Iq* and a desired hysteresis h as outlined above. In this case, the charge transfer circuit 14, which operates as a boost converter, operates in a so-called critical conduction mode (CritCM).

According to another example illustrated in FIG. 11B, the second current threshold Iql has a predefined current level that is below zero. In this case, the charge transfer circuit operates in a so-called triangular current mode (TCM). This operating mode enables a so-called zero voltage switching of the half-bridge 15H, 15L in the charge transfer circuit.

According to another example shown in FIG. 11C, both, the upper current threshold Iqh and the lower current threshold Iql are higher than zero. In this example, the inductor current Iq does not decrease to zero, so that the charge transfer circuit 14 operates in a continuous conduction mode (CCM).

In each case, the hysteresis h may be constant, or may be varied in order to keep the switching frequency fsw within a desired frequency range. Basically, at a given hysteresis h, the switching frequency decreases as the voltage Upq across the first capacitor 11 decreases.

Figure 11D:
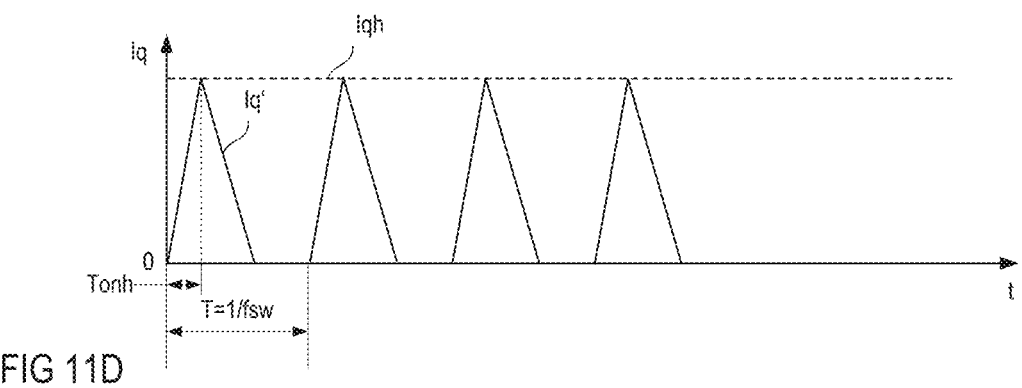
Figure 11E:
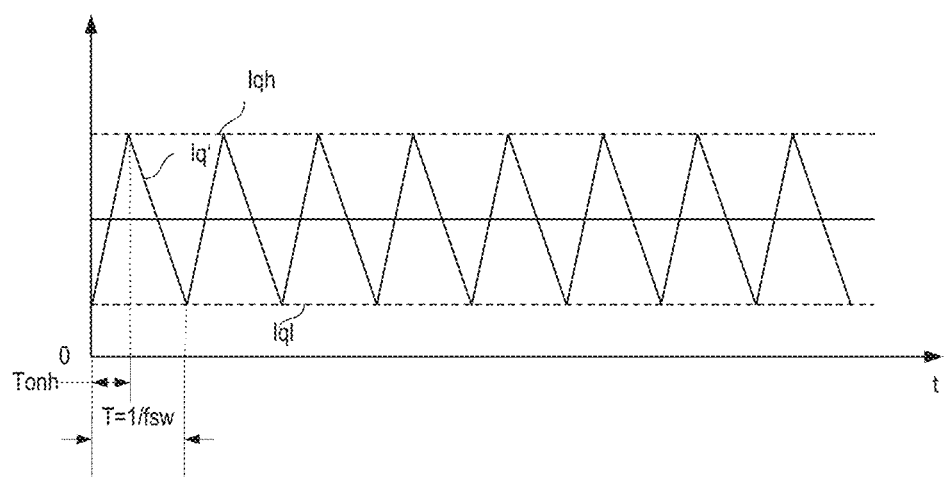

According to another example, the PWM circuit 24 operates as a peak controller. In this example, the PWM circuit 24 calculates the upper current limit Iqh dependent on the inductor current reference Iq* and switches on the high-side switch 15H at a predefined switching frequency fsw=1/T, wherein the high-side switch 15H remains in the on-state until the inductor current Iq (as represented by the measured inductor current Iq') reaches the upper current threshold Iqh. FIGS. 11D-11E show signal diagrams that illustrate the operating principle of a PWM circuit 24 operating as a peak current controller.

A PWM circuit 24 operating as a peak current controller may cause the charge transfer circuit 14 to operate in a discontinuous current mode (DCM) as shown in FIG. 11D, or in a continuous current mode (CCM) as shown in FIG. 11E.

In the DCM, the inductor current Iq decreases to zero before the high-side switch 15H again switches and remains essentially at zero until the end of the drive cycle and the beginning of a new drive cycle. In this operating mode, the PWM circuit 24 may switch on the low-side switch 15L after switching off the high-side switch and maintain the low-side switch 15L in the on-state until the inductor current Iq reaches zero. After switching of the low-side switch 15L, both the high-side switch 15H and the low-side switch 15L are in the off-state until the end of the drive cycle. Alternatively, the PWM circuit 14 maintains the low-side switch 15L in the off-state throughout DCM, so that the freewheeling element of the low-side switch 15L conducts the inductor current Iq after the high-side switch 15H switches off.

In the CCM, the inductor current Iq does not decreases to zero before the high-side switch 15H again switches. In this operating mode, the PWM circuit 24 may switch on the low-side switch 15L after switching off the high-side switch and maintain the low-side switch 15L in the on-state until the high-side switch 15H again switches on. Alternatively, the PWM circuit 14 maintains the low-side switch 15L in the off-state throughout DCM, so that the freewheeling element of the low-side switch 15L conducts the inductor current Iq after the high-side switch 15H switches off.

It should be noted that implementing the control circuit 2 such that it includes a PWM circuit operating as hysteretic controller or a peak current controller is only an example. Other control schemes that are suitable to control the inductor current Iq in order to regulate the first voltage Upn may be used as well.

Figure 12:
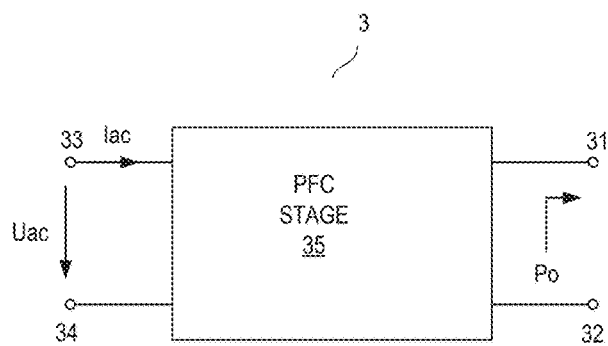
FIG. 12 shows one example of a power source that includes a PFC (Power Factor Correction) stage configured to receive an alternating input voltage.
Figure 13:
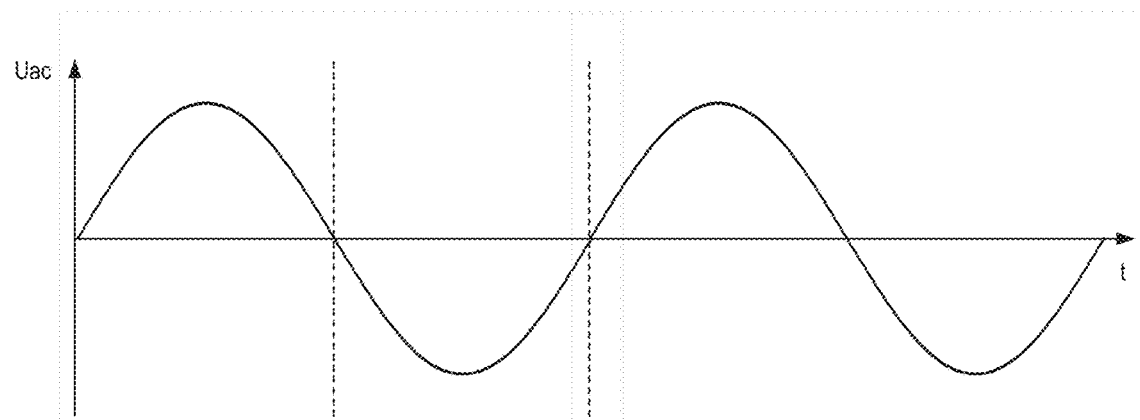
FIG. 13 shows a signal diagram of an alternating input voltage according to one example.

FIG. 12 illustrates one example of the power source 3. In this example, the power source 3 includes a PFC (Power Factor Correction) stage 35 that is configured to receive an alternating input voltage Uac at an input, wherein the input includes a first input node 33 and a second input node 34. According to one example, the input voltage Uac is a sinusoidal input voltage as illustrated in FIG. 13. The input voltage Uac may be received from a power grid and is a 110 Vrms or 230 Vrms voltage with a frequency of 50 Hz or 60 Hz, for example.

Figure 14:
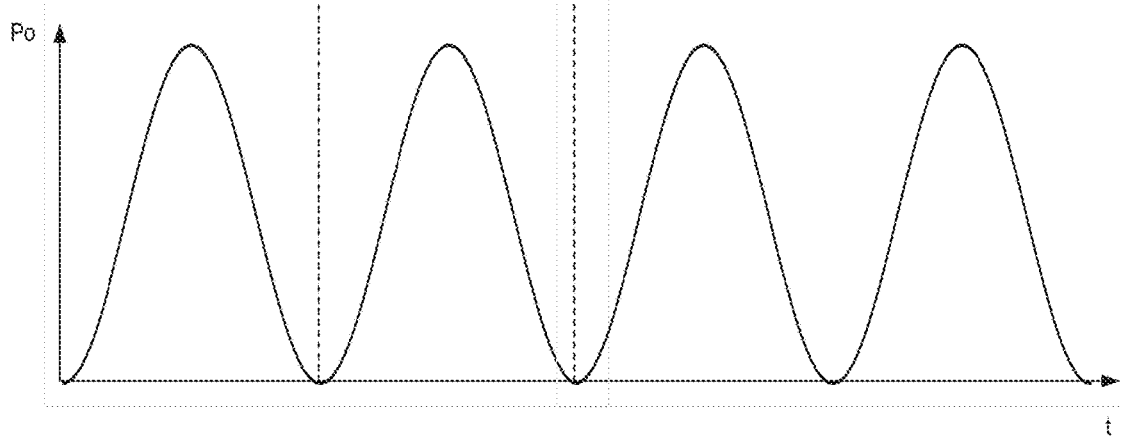
FIG. 14 shows a signal diagram of a varying output power provided by the PFC stage, according to one example.

The PFC stage 35 may be configured to regulate an input current Iac received at the input 33, 34 such that the input current Iac is essentially proportional to the alternating input voltage Uac. This has the effect that a power received by the PFC stage 35 at the input 33, 34 and, therefore, the output power Po provided at the output 31, 32 has a sine-square waveform as illustrated in FIG. 14, so that the output power Po regularly oscillates between a maximum power level and zero. The oscillating frequency is twice the frequency of the input voltage Uac.

In the first operating mode, the PFC stage 35 regulates the output power Po such that the first voltage Upn has a desired voltage level. In this case, the average output power Po essentially equals the input power Pin received by the load 4. The "average output power" is the output power Po averaged at least over one half-period or at least over one period of the input voltage Uac.

The variation of the output power Po illustrated in FIG. 14 is buffered by the first capacitor 11 in the first operating mode. When the instantaneous level of the output power Po is higher than the average output power and, therefore, higher than the input power Pin received by the load 4, charge is stored in the first capacitor 11. When the instantaneous level of the output power Po is lower than the average power level energy is taken from the first capacitor 11.

Figure 15:
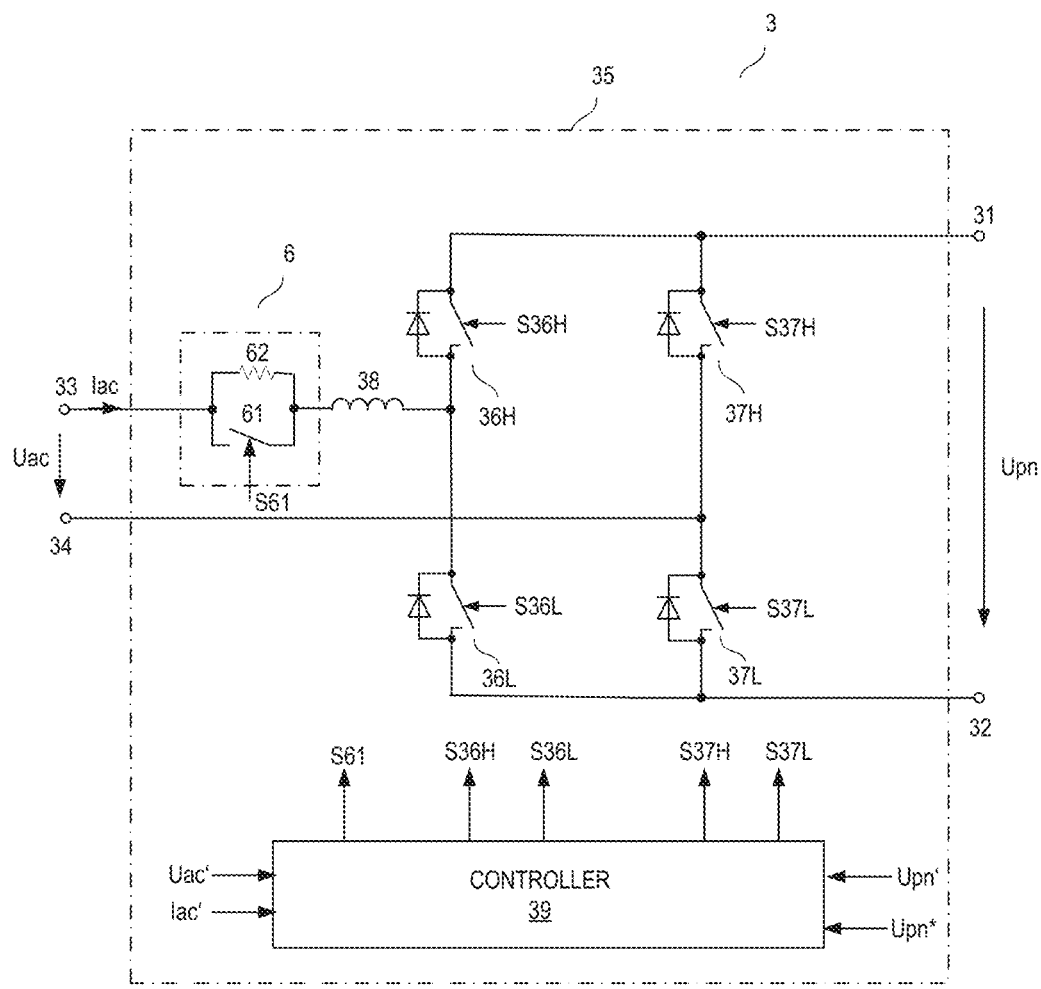
FIG. 15 shows one example of the PFC stage.

FIG. 15 illustrates on example of the PFC stage 35. In the example shown in FIG. 15, the PFC stage 35 has a so-called totem-pole topology. This, however, is only an example. The PFC stage 35 may be implemented using any other kind of PFC stage topology as well.

The PFC stage 35 according to FIG. 15 includes a first half-bridge with a first high-side switch 36H and a first low-side switch 36L connected in series between the output nodes 31, 32, and a second half-bridge with a second high-side switch 37H and a second low-side switch 37L connected in series between the output nodes 31, 32. A tap of the first half-bridge, which is a circuit node at which the first high-side switch 36H and the first low-side switch 36L are connected, is coupled to the first input node 33, and a tap of the second half-bridge, which is a circuit node at which the second high-side switch 37H and the second low-side switch 37L are connected, is coupled to the second input node 34. Furthermore, the PFC stage includes an inductor 38 coupled between the input 33, 34 and the half-bridges. In the example shown in FIG. 15, the inductor 38 is connected between the first input node 33 and the tap of the first half-bridge 36H, 36L. According to another example (not shown), the inductor 38 is connected between the second input node 34 and the tap of the second half-bridge 37H, 37L.

Referring to FIG. 15, the PFC stage 35 further includes a controller 39 that is configured to control operation of the first and second high-side switches 36H, 37H and the first and second low-side switches 36L, 37L such that the first voltage Upn is regulated to have a voltage level that essentially equals a desired voltage level represented by a first voltage reference Upn* and such that the alternating input current Iac is essentially proportional to the alternating input voltage Uac. The input current Iac may be in phase with the input voltage Uac. According to another example, there is a predefined phase shift between the input voltage Uac and the input current Iac.

The controller 39, in addition to the first voltage reference Upn*, receives the measured first voltage Upn', a measured input voltage Uac', which represents the input voltage Uac, and a measured input current Iac', which represents the input current Iac. Based on these signals, the controller 39 generates first and second high-side drive signals S36H, S37H for driving the first and second high-side switches 36H, 37H, and first and second low-side signals S36L, S37L for driving the first and second low-side switches 36L, 37L. The controller 39 may operate the first high-side switch 36H and the first low-side switch 36L in a PWM fashion at a switching frequency that is significantly higher than the frequency of the input voltage Uac. According to one example, the switching frequency is at least several kilohertz (kHz). Furthermore, the controller 39 operates the second high-side switch 37H and the second low-side switch 37L such that during positive half-periods of the input voltage Uac the second low-side switch 37L is switched on and the second high-side switch 37H is switched off, and during the negative half periods of the input voltage Uac the second high-side switch 37H is switched on and the second low-side switch 37L is switched off. A PFC stage 35 of the type shown in FIG. 9 and the functionality of a controller 39 of the type shown in FIG. 15 is commonly known, so that no further explanation is required in this regard.

Optionally, the PFC stage 35 includes a startup circuit 6. The startup circuit 6 may include a switch 61 and a resistor 62 connected in parallel with the electronic switch 61. In the example shown in FIG. 15, the startup circuit 6 is connected between the first circuit node 33 and the inductor 38. This, however, is only an example. According to another example (not illustrated) the startup circuit is connected between the second input node 34 and the second half-bridge. The switch 61 is a relay, for example, and may be controlled by the controller 39.

Referring to the above, the control circuit 2 is configured to operate the buffer circuit 1 in the first operating mode or the second operating mode dependent on a mode select signal $S_{SEL}$ According to one example, the mode select signal $S_{SEL}$ is the measured input voltage Uac' and the control circuit 2 is configured to change operation of the buffer circuit 1 from the first operating mode to the second operating mode when the measured input voltage Uac' indicates that the input voltage Uac is zero for more than a predefined time period. The predefined time period is selected from between 0.5 milliseconds and 2 milliseconds, for example.

According to one example, in addition to the first operating mode and the second operating mode, the buffer circuit 1 is configured to operate in a third operating mode, which is referred to as recovery mode in the following. According to one example, the buffer circuit 1 operates in the recovery mode after the second operating mode and before again operating in the first operating mode, wherein operating the buffer circuit 1 in the recovery mode serves to recharge the first capacitor 11 in a controlled manner Referring to the above, the first capacitor 11 is discharged during the second operating mode (that is, during the hold-up time). If the buffer circuit 1 would return to the first operating mode immediately after the power source 3 resumes to provide output power Po, the second capacitor 12 would be rapidly discharged and the first capacitor 11 would be rapidly charged, which may cause high inrush currents.

According to one example, the transfer circuit 14 controlled by the control circuit 2, in the recovery mode, continuous to regulate the first voltage Upn, wherein regulating the first voltage Upn in this operating mode may result in a charge transfer from the second capacitor 12 to the first capacitor 11 or from the first capacitor 11 to the second capacitor 12. The operating principle of the charge transfer circuit 14 when transferring charge from the second capacitor 12 to the first capacitor 11 is the same as the operating principle when transferring charge from the first capacitor 11 to the second capacitor 12. That is, in each case the reference current controller 23 (see FIG. 9) may generate the inductor current reference Iq* based on the first voltage reference Upn* and the measured first voltage Upn', wherein the output current reference Iq* has a first sign when charge is to be transferred from the first capacitor 11 to the second capacitor 12 and a second sign opposite the first sign when charge is to be transferred from the second capacitor 12 to the first capacitor 11.

Figure 16:
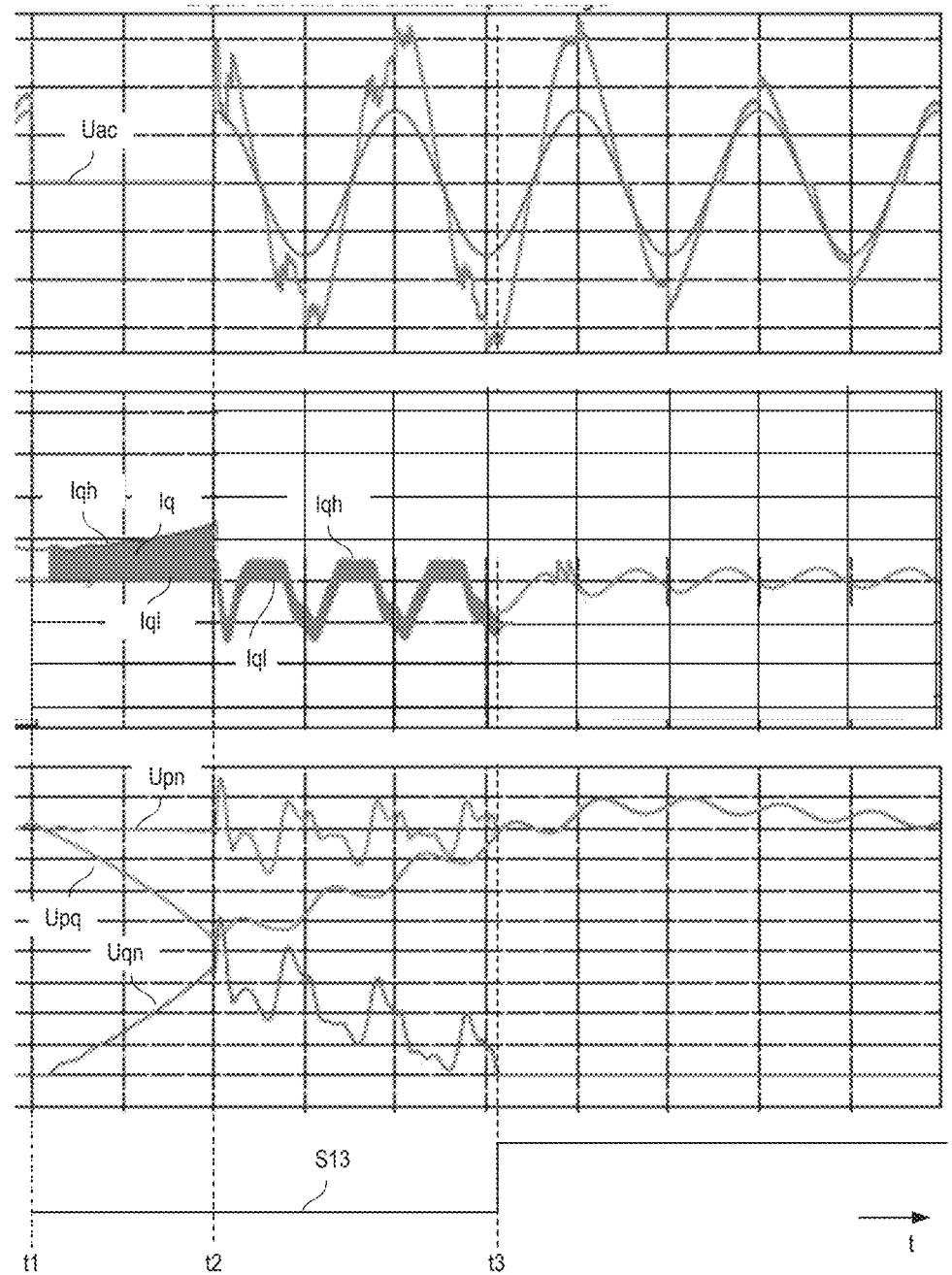
FIG. 16 shows signal diagrams that illustrate operating of the buffer circuit in different operating modes.

FIG. 16 shows signal diagrams that illustrate operating the buffer circuit 1 in the recovery mode. In particular, FIG. 16 shows signal diagrams of the first voltage Upn, the second voltage Upq, the input voltage Uac, the inductor current Iq and the switch drive signal S13. FIG. 16 illustrates operating the buffer circuit 1 in the second operating mode, the recovery mode after the second operating mode, and the first operating mode after the recovery mode. More specifically, in the example illustrated in FIG. 16, the buffer circuit 1 starts operating in the second operating mode at a first time instance t1, which is a time instance at which the alternating input voltage Uac received by the power source 3 decreases to zero and remains at zero throughout the second operating mode.

As explained above, in the second operating mode, the first voltage Upn is regulated to be essentially constant by the charge transfer circuit 14, while the second voltage Upq across the first capacitor 11 decreases and the third voltage across the second capacitor 12 increases. In the example illustrated in FIG. 16 it is assumed that the input power Pin received by the load 4 is essentially constant during the hold-up time (the time period in which the buffer circuit 1 is in the second operating mode). In the recovery mode, the control circuit 2 may operate as a hysteretic controller, so that the upper current threshold Iqh and the lower current threshold Iql are defined by the inductor current reference Iq*. This, however, is only an example. According to another example, the control circuit 2, in the second operating mode, may operate as a peak current controller, so that the upper current threshold Iqh is defined by the inductor current reference Iq* and the switching frequency is predefined.

At a second time instance t2, the alternating input voltage Uac returns so that the power source 3 is again capable of providing output power Po and regulating the first voltage Upn. Referring to the above, the output power Po is pulsating at a frequency twice the frequency of the input voltage Uac. This pulsating output power Po causes voltage ripples of the first voltage Upn. These voltage ripples are higher than in the first operating mode because the capacitance between the first circuit node p and the second circuit node n is lower in the second operating mode than in the first operating mode. In the first operating mode, this capacitance is given by the capacitance C11 of the first capacitor 11. In the second operating mode, this capacitance is given by the capacitance of the capacitor series circuit, which is given by C1·C2/C1+C2 and is lower than the capacitance of the second capacitor 12. The pulsating output power Po may have the effect that the first voltage Upn rises above the first voltage reference Upn* received by the control circuit 2 or falls below this first voltage reference Upn*.

In the recovery mode, the charge transfer circuit 14 controlled by the control circuit 2 counteracts such ripples (variations) of the first voltage Upn by transferring charge between the first capacitor 11 and the second capacitor 12. As can be seen from FIG. 16, there are time periods in which the average inductor current Iq is negative. These are the time periods in which the output power Po provided by the power source 3 causes the first voltage Upn to be higher than the first voltage reference Upn*, so that the charge transfer circuit 14 transfers charge from the second capacitor 12 to the first capacitor 11.

In the recovery mode, the control circuit 2 may operate as a hysteretic controller, so that the upper current threshold Iqh and the lower current threshold Iql are defined by the inductor current reference Iq*. In this case the average inductor current essentially equals the inductor current reference Iq*.

Furthermore, there are time periods in which the charge transfer circuit 14 transfers charge from the first capacitor 11 to the second capacitor 12. These are the time periods in which the output power Po provided by the power source 3 causes the first voltage Upn to be lower than the first voltage reference Upn*. However, charge transfer from the second capacitor 12 to the first capacitor 11 prevails so that the second voltage Upq is increased over the time period in which the buffer circuit 1 operates in the recovery mode and the third voltage Uqn is decreased. According to one example, the control circuit monitors the first voltage Upn and the second voltage Upq and the buffer circuit 1 stops operating in the recovery mode when the control circuit 2 detects that a difference between the first voltage Upn and the second voltage Upq is lower than a predefined threshold. According to one example, the threshold is selected from between 0.1V and 5V. At this time instance, the charge transfer circuit 14 is deactivated and the electronic switch 13 is switched on so that the second capacitor 12 is short-circuited (deactivated) and the buffer circuit 1 enters the first operating mode. In the example illustrated in FIG. 16, the buffer circuit 1 enters the first operating mode at a third time instance t3.

Referring to the above, the power source 3 may include a startup circuit 6 with a switch 61 and a resistor 62 connected in parallel. The power source 3 may operate in a startup mode after the input voltage Uac has been applied to the input 33, 34. In the startup mode, the switch 61 in the startup circuit 6 is switched off and the input current Iac flows from the input via the resistor 62 of the startup circuit 6 and freewheeling elements of the high-side and low-side switches 36H, 37H, 36L, 37L to the output 31, 32 to at least charge the second capacitor 12 in the buffer circuit 1. During the positive half-periods of the input voltage Uac, the input current Iac flows via the freewheeling element of the first high-side switch 36H and the freewheeling element of the second low-side switch 37L. During the negative half-period of the input voltage Uac, the input current Iac flows via the freewheeling element of the second high-side switch 37H and the freewheeling element of the first low-side switching 36L.

Dependent on the implementation of the electronic switch 13 in the buffer circuit 1 only the first capacitor 11 or both the first capacitor 11 and the second capacitor 12 are charged at the beginning of the startup mode of the power source 3.

According to one example, the electronic switch 13 is implemented as a normally-on transistor. In this example, the electronic switch 13 is in an on-state at the beginning of the startup mode. In this case, only the first 11 is charged by the input current Iac during the startup mode of the power source 3. According to one example, the control circuit 2 receives its power supply from the second capacitor 12. Thus, when the electronic switch 13 includes a normally-on transistor, the electronic switch 13 is in an on-state before the control circuit 2 receives a power supply from the second capacitor 12.

According to another example, the electronic switch 13 includes a normally-off transistor. In this example, the electronic switch 13 is in an off-state at the beginning of the startup mode, so that both the first capacitor 11 and the second capacitor 12 are charged as soon as the alternating voltage Uac is applied to the power source 3. In this example, the control circuit 2 may switch on the electronic switch 13 after it receives a power supply from the second capacitor 12. However, switching on the electronic switch 13 after the second capacitor 12 has been charged may cause the second capacitor 12 to be rapidly discharged, which may involve an undesirable high current.

Thus, according to one example, the buffer circuit 1 is configured to operate in a fourth operating mode, which is referred to as startup mode in the following. In the startup mode, the charge transfer circuit 4 controlled by the control circuit 2 discharges the second capacitor 12 in a defined manner According to one example, in the startup mode, the charge transfer circuit 14 discharges the second capacitor 11 and transfers the charge stored in the second capacitor 12 to the first capacitor 11. Referring to FIG. 9, the reference current controller 23 may include a further current controller 26, wherein the further current controller 26 is configured, in the startup mode, to generate the inductor current reference Iq* such that it defines a desired current level of the inductor current during the startup mode, wherein this inductor current reference Iq* is selected such that the second capacitor 12 is discharged.

Figure 17:
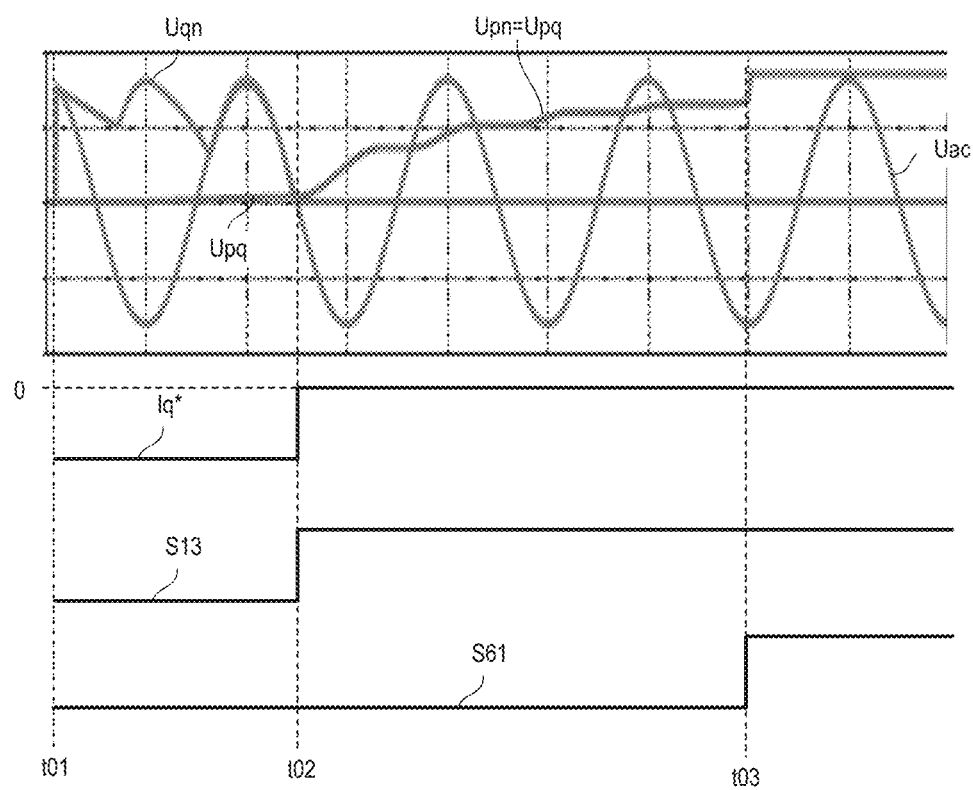
FIG. 17 shows signal diagrams that illustrate operating the buffer circuit in a startup mode.

FIG. 17 shows signal diagrams that illustrate operating the buffer circuit in the startup mode. More specifically, FIG. 17 shows signal diagrams of the first voltage Upn, the second voltage Upq, the input voltage Uac, the drive signal S13 of the electronic switch and the drive signal S61 of the electronic switch in the startup circuit 6 of the power source.

Referring to FIG. 17, at a first time instance t01, the alternating voltage Uac is applied to the power source 3. The third voltage Uqn essentially follows the input voltage Uac at the beginning of the startup mode and may be significantly higher than the second voltage Upq. This is because the capacitance C12 of the second capacitor 12 is much lower than the capacitance of the first capacitor 11, so that the voltage provided by the power source 3 mainly drops across the second capacitor 12. Furthermore, due to the small capacitance of the second capacitor 12 relative to the capacitance of the first capacitor 11 transferring charge from the second capacitor 12 to the first capacitor 11 during the startup mode does not significantly charge the first capacitor 11 so that the second voltage Upq may remain relatively low during the startup mode. The inductor current reference Iq*, in the startup mode, is selected such that over one half-period of the alternating voltage Uac more charge is transferred from the second capacitor 12 to the first capacitor 11 than the second capacitor 12 may receive from the power source, so that the second capacitor 12 is finally discharged during the startup mode.

According to one example, the control circuit 2 switches on the electronic switch 13 when the third voltage Uqn has decreased to zero, so that the buffer circuit 1 starts operating in the first operating mode. This is illustrated at a second time instance t02 in FIG. 17. At this time instance, the first voltage Upn may be very low. However, the control circuit 2 may have received the energy required to switch on the electronic switch 13 already before during those time periods in which the first voltage Upn (=Upq+Uqn) was sufficiently high to supply the control circuit 2.

After the electronic switch 13 has been switched on, so that the buffer circuit 1 operates in the first operating mode, the power source 3 may continue to operate in the startup mode, in which the electronic switch 61 in the power source 3 is switched off. In the further course of the startup mode of the power source 3, the first capacitor 11 is charged each time the input voltage Uac is higher than the instantaneous voltage level of the first voltage Upn. According to one example, the control circuit 39 of the PFC stage 35 in the power source 3 is configured to switch on the electronic switch 61 in the startup circuit when the voltage level of the first voltage Upn is higher than a predefined voltage threshold. According to one example, this threshold is selected from between 90% and 100% of a peak voltage of the input voltage.

In FIG. 17, t03 denotes the time instance at which the first voltage Upn reaches the voltage threshold and the switch 61 in the startup circuit 6 of the power source 3 switches on. At this time instance, the PFC stage 35 starts operation and regulates the first voltage Upn so that the first voltage Upn has a predefined voltage level defined by the first voltage reference Upn*. According to one example, this voltage level is higher than the peak of the input voltage Uac. According to one example, the input voltage Uac is a 230 Vrms voltage. In this case, the peak is 325 V. According to one example, the desired voltage level of the first voltage Upn is between 350 V and 450 V.

Figure 18:
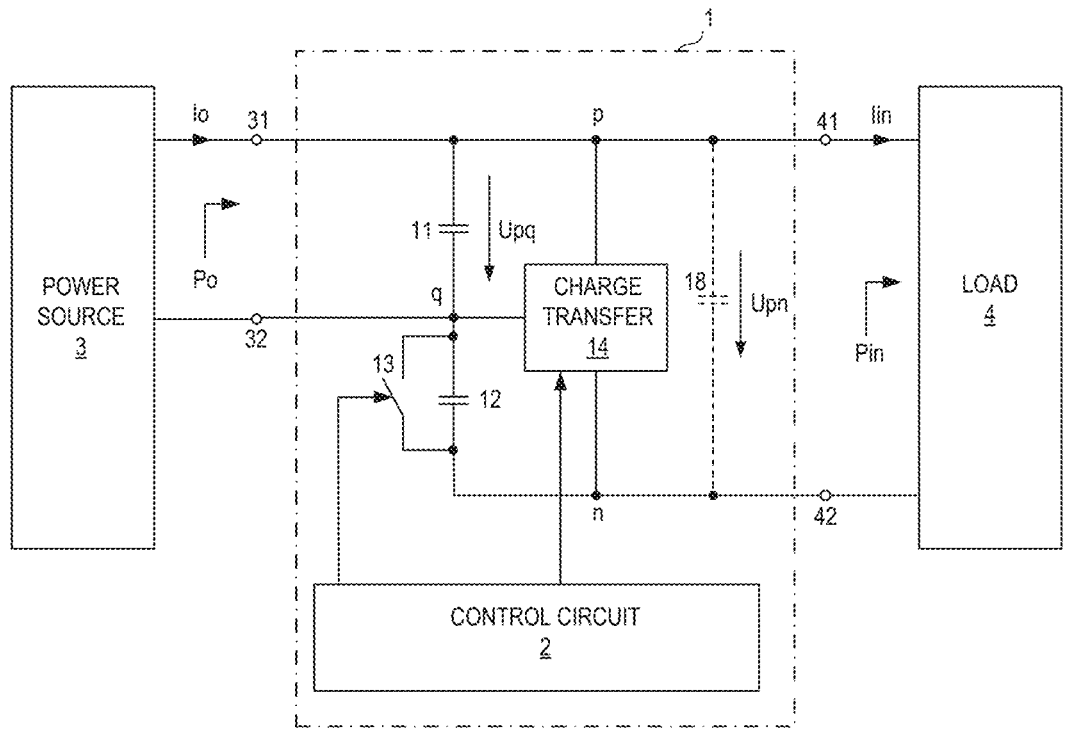
FIGS. 18 and 19 show modifications of the buffer circuit according to FIG. 1.

In the example illustrated in FIG. 1, the first output node 31 of the power source 3 is connected to the first circuit node p of the buffer circuit 3 and the second output node 32 of the power source 3 is connected to the second circuit node n of the buffer circuit 1. This, however, is only an example. According to another example shown in FIG. 18, the first output node 31 of the power source 3 is connected to the first circuit node p of the buffer circuit 3 and the second output node 32 of the power source 3 is connected to the third circuit node q of the buffer circuit 1. In this example, only the first capacitor 11 is charged during the start-up mode of the power source and before the electronic switch 13 switches on, so that operating the buffer circuit 1 in order to discharge the second capacitor 12 is not necessary. The control circuit 2 may simply switch on the electronic switch 13 as soon as it receives power. In this example, the control circuit 2 may receive its power supply from the first capacitor.

Figure 19:
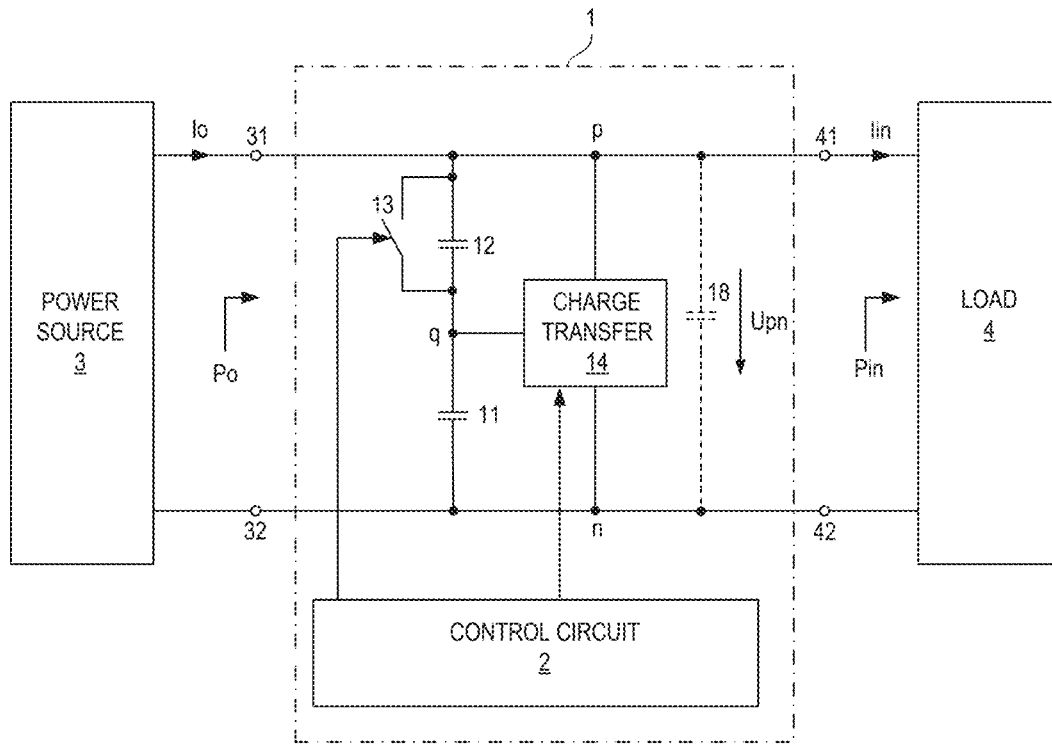

According to another example illustrated in FIG. 19, the first capacitor 11 is connected between the third circuit node q and the second circuit node n, and the second capacitor 12 is connected between the first circuit node p and the third circuit node q.

In each case, an optional third capacitor 18 (illustrated in dashed lines) may be connected between the first circuit node p and the second circuit node n, wherein the third capacitor 18 stabilizes the first voltage Upn. According to one example, a capacitance of the third capacitance is between 5% and 10% of the capacitance C11 of the first capacitor 11.

The load 4 may be any kind of electric load that is configured to receive a direct input voltage, such as the first voltage Upn. According to one example, the load 4 includes a DC-DC converter that is configured to receive the first voltage Upn and generate a direct voltage higher than the first voltage Upn or lower than the first voltage Upn to drive a DC load. According to another example, the load includes an inverter that is configured to drive a motor.

Figure 20:
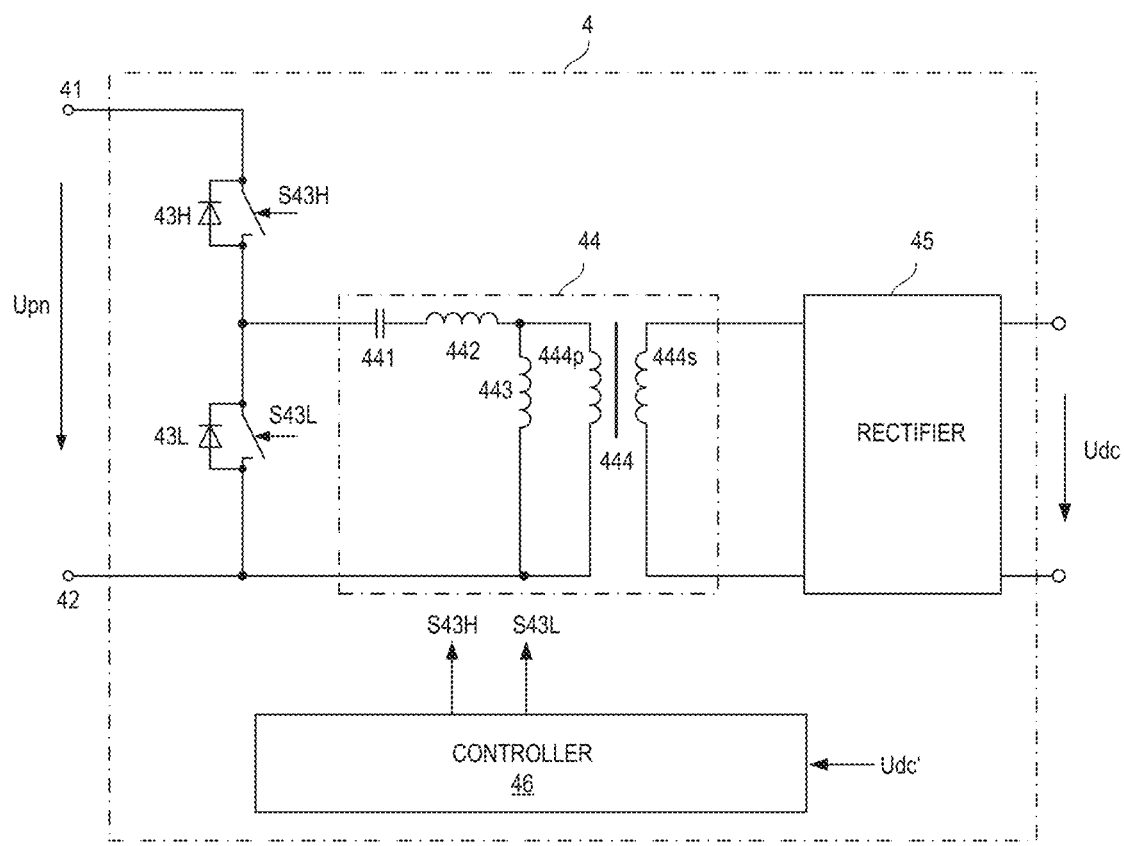
FIG. 20 shows one example of a load that includes a DC-DC converter implemented as an LLC converter.

One example of a DC-DC converter included in the load 4 is illustrated in FIG. 20. In this example, the DC-DC converter is implemented as an LLC converter. In this case, DC-DC converter includes a half-bridge with a high-side switch 43H and a low-side switch 43L, wherein the high-side switch 43H and the low-side switch 43L are connected in series between the input nodes 41, 42. An LLC circuit 44 that includes a capacitor 441 and two inductors 442, 443 is connected between a tap of the half-bridge and the second input node 42. The LLC circuit 44 further includes a transformer 444 with a primary winding 444p and a secondary winding 444s. The primary winding 444p is connected in parallel with the second inductor 443. Furthermore, the DC-DC converter includes a rectifier 45 connected to the secondary winding 444s and configured to provide an output voltage Udc based on a voltage across the secondary winding 444s. A controller 46 controls operation of the high-side switch 43H and the low-side switch 43L in such a way that the output voltage Udc is regulated. According to one example, the controller 46 is configured to regulate the output voltage Udc by varying a switching frequency of drive signals S43H, S43L received by the high-side switch 43H and the low-side switch 43L. An LLC converter is commonly known so that no further explanation is required in this regard.

Figure 21:
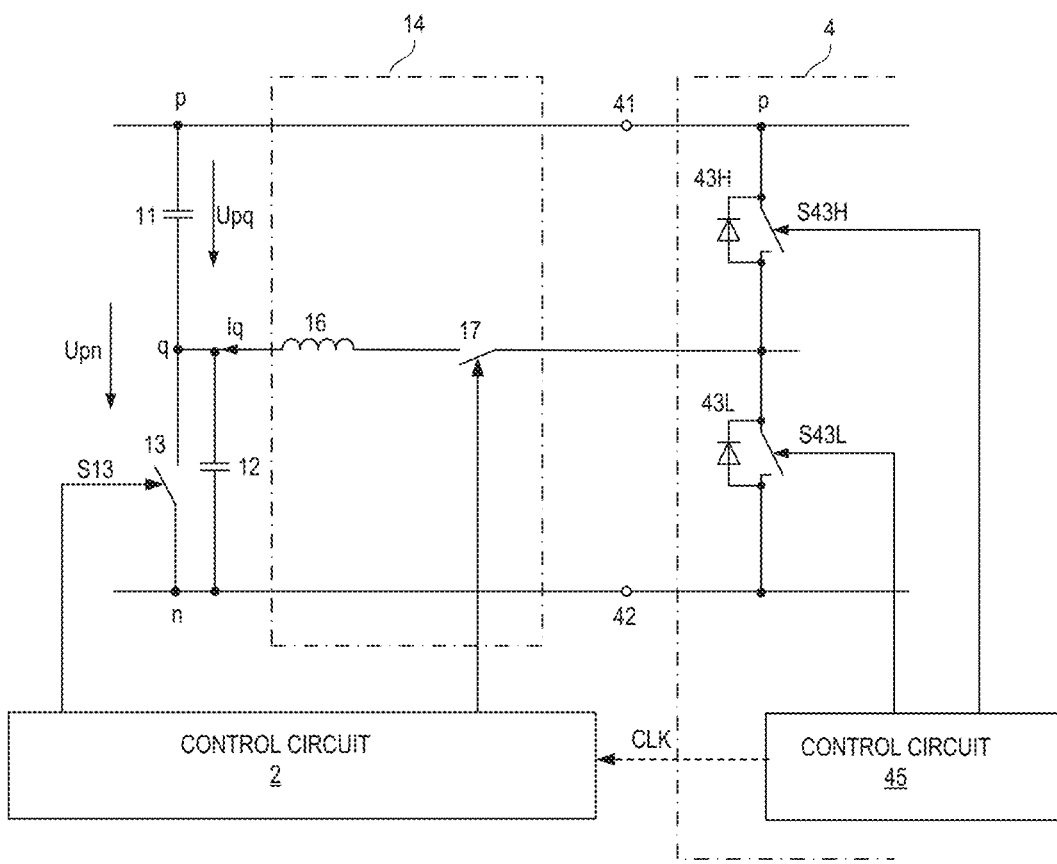
FIG. 21 shows one example of a charge transfer circuit in which a half-bridge of the charge transfer circuit is included in the load.

Referring to the above, the charge transfer circuit 14 includes a half-bridge with a high-side switch 15H and a low-side switch 15L connected in series between the first circuit node p and the second circuit node n. According to one example, the half-bridge is part of the power source 3 or the load 4, so that the half-bridge is used by both the charge transfer circuit 14 and the power source 3 or the load. FIG. 21 illustrates one example of a charge transfer circuit 14 implemented in this way.

In the example shown in FIG. 21, the half-bridge of the charge transfer circuit is at the same time the half-bridge of the LLC converter shown in FIG. 20. In addition to the half-bridge, the charge transfer circuit includes a bidirectionally blocking switch 17 connected between a tap of the half-bridge and the inductor 16 and controlled by the control circuit 2. In this example, time periods at which the high-side switch 43H is switched on and time periods at which the low-side switch 43L is switched on are defined by the control circuit 45 of the DC-DC converter. A clock signal CLK received by the control circuit 2 of the charge transfer circuit 14 from the control circuit 45 of the DC-DC converter may represent these time periods. The control circuit 2 is configured to control the inductor current Iq and, therefore to regulate the first voltage Upn by suitable modulating the on-time of the switch 17 during the on-times of the high-side switch 43H and the low-side switch 43L, wherein the inductor 16 is energized by energy stored in the first capacitor 11 when switch 17 switches on during the on-time of the high-side switch 43H, and wherein inductor 16 is de-energized and transfers energy to the second capacitor when switch 17 switches on during the on-time of the low-side switch 43L. In other words, the clock signal CLK defines time frames in which the inductor 16 can be energized and de-energized and control circuit 2 adjusts the duration of the on-times of switch 17 with these time frames in order to control the inductor current Iq.

According to another example (not shown), the transfer circuit 14 may use the first half-bridge 36H, 36L of the PFC stage 35 according to FIG. 15 instead of the half-bridge 43H, 43L of the load 4.

Some of the aspects explained above are summarized in the following by way of numbered examples.

Example 1. A method, including: operating a buffer circuit in a first operating mode or a second operating mode, wherein operating the buffer circuit in the first operating mode includes buffering, by a first capacitor of the buffer circuit, power provided by a power source and received by a load, and wherein operating the buffer circuit in the second operating mode includes: connecting a second capacitor in series with the first capacitor to form a capacitor series circuit, supplying power to the load by the capacitor series circuit, and regulating a first voltage across the capacitor series circuit, wherein regulating the first voltage includes transferring charge from the first capacitor to the second capacitor. Example 2. The method according to example 1, further including: monitoring an input voltage received by the power source; and operating the buffer circuit in the second operating mode when the input voltage is zero for longer than a predefined time period.

Example 3. The method according to example 1 or 2, wherein the second capacitor is connected in parallel with an electronic switch, wherein the capacitor series circuit is connected between a first circuit node and a second circuit node, wherein operating the buffer circuit in the first operating mode includes switching on the electronic switch, and wherein operating the buffer circuit in the second operating mode includes switching off the electronic switch.

Example 4. The method according to any one of the preceding examples, further including: operating the buffer circuit in a third operating mode after the second operating mode and before the first operating mode, wherein operating the buffer circuit in a the operating mode includes transferring charge from the second capacitor to the first capacitor.

Example 5. The method according to example 4, further including: monitoring the first voltage and monitoring a second voltage across the first capacitor, and operating the buffer circuit in the first operating mode when a difference between the first voltage and the second voltage is lower than a predefined threshold.

Example 6. The method according to any one examples 1 to 5, wherein transferring charge from the first capacitor to the second capacitor includes using a charge transfer circuit coupled to the first capacitor and the second capacitor, wherein the charge transfer circuit includes a half-bridge and an inductor.

Example 7. The method according to example 6, wherein the half-bridge is controlled by a control circuit of the charge transfer circuit dependent on a voltage level of the first voltage.

Example 8. The method according to example 6, wherein the load includes a DC-DC converter, wherein the half-bridge is controlled by a controller of the DC-DC converter, wherein the charge transfer circuit further includes an electronic switch coupled to a tap of the half-bridge and coupled to the inductor, and wherein the electronic switch is controlled by a control circuit of the charge transfer circuit dependent on a voltage level of the first voltage.

Example 9. The method according to any one of examples 1 to 8, wherein the power source includes a PFC stage.

Example 10. A control circuit configured to operate a buffer circuit in a first operating mode or a second operating mode, wherein operating the buffer circuit in the first operating mode includes buffering, by a first capacitor of the buffer circuit, power provided by a power source and received by a load, and wherein operating the buffer circuit in the second operating mode includes: connecting a second capacitor in series with the first capacitor to form a capacitor series circuit, supplying power to the load by the capacitor series circuit, and regulating a first voltage across the capacitor series circuit, wherein regulating the first voltage includes transferring charge from the first capacitor to the second capacitor.

Example 11. The control circuit according to example 1, wherein the control circuit is further configured to monitor an input voltage received by the power source, and operate the buffer circuit in the second operating mode when the input voltage is zero for longer than a predefined time period.

Example 12. The control circuit according to example 10 or 11, wherein the second capacitor is connected in parallel with an electronic switch, wherein the capacitor series circuit is connected between a first circuit node and a second circuit node, and wherein the control circuit is configured to switch on the electronic switch in order to operate the buffer circuit in the first operating mode and to switch off the electronic switch in order to operate the buffer circuit in the second operating mode.

Example 13. The control circuit according to any one of examples 10 to 12, wherein the control circuit is further configured to operate the buffer circuit in a third operating mode after the second operating mode and before the first operating mode, wherein operating the buffer circuit in a the operating mode includes transferring charge from the second capacitor to the first capacitor.

Example 14. The control circuit according to example 13, wherein the control circuit is further configured to monitor the first voltage and to monitor a second voltage across the first capacitor, and to operate the buffer circuit in the first operating mode when a difference between the first voltage and the second voltage is lower than a predefined threshold.

Example 15. The control circuit according to any one of examples 10 to 14, wherein the control circuit is configured to control operation of a charge transfer circuit in order to transfer charge from the first capacitor to the second capacitor, wherein the charge transfer circuit includes a half-bridge and an inductor.

Example 16. The control circuit according to example 15, wherein the control circuit is configured to control the half-bridge dependent on a voltage level of the first voltage.

Example 17. An electronic circuit, including: a buffer circuit including a first capacitor and a second capacitor; and a control circuit according to any one of examples 10 to 16.

Example 18. The electronic circuit according to example 17, further including: the power source and the load.

What is claimed is:

1. A method, comprising:
operating a buffer circuit in a first operating mode or a second operating mode,
wherein operating the buffer circuit in the first operating mode comprises buffering, by a first capacitor of the buffer circuit, power provided by a power source and received by a load,
wherein operating the buffer circuit in the second operating mode comprises:
connecting a second capacitor in series with the first capacitor to form a capacitor series circuit;
supplying power to the load by the capacitor series circuit; and
regulating a first voltage across the capacitor series circuit,
wherein regulating the first voltage comprises transferring charge from the first capacitor to the second capacitor, wherein the method further comprises:
monitoring an input voltage received by the power source; and
operating the buffer circuit in the second operating mode when the input voltage is zero for longer than a predefined time period.

2. The method of claim 1,
wherein the second capacitor is connected in parallel with an electronic switch,
wherein the capacitor series circuit is connected between a first circuit node and a second circuit node,
wherein operating the buffer circuit in the first operating mode comprises switching on the electronic switch, and
wherein operating the buffer circuit in the second operating mode comprises switching off the electronic switch.

3. The method of claim 1, further comprising:
operating the buffer circuit in a third operating mode after the second operating mode and before the first operating mode,
wherein operating the buffer circuit in the third operating mode comprises transferring charge from the second capacitor to the first capacitor.

4. The method of claim 3, further comprising:
monitoring the first voltage and a second voltage across the first capacitor; and
operating the buffer circuit in the first operating mode when a difference between the first voltage and the second voltage is lower than a predefined threshold.

5. The method of claim 1,
wherein transferring charge from the first capacitor to the second capacitor comprises using a charge transfer circuit coupled to the first capacitor and the second capacitor,
wherein the charge transfer circuit includes a half-bridge and an inductor.

6. The method of claim 5,
wherein the half-bridge is controlled by a control circuit of the charge transfer circuit dependent on a voltage level of the first voltage.

7. The method of claim 5,
wherein the load comprises a DC-DC converter,
wherein the half-bridge is controlled by a controller of the DC-DC converter,
wherein the charge transfer circuit further includes an electronic switch coupled to a tap of the half-bridge and coupled to the inductor, and
wherein the electronic switch is controlled by a control circuit of the charge transfer circuit dependent on a voltage level of the first voltage.

8. The method of claim 1, wherein the power source comprises a PFC stage.

9. A control circuit comprising circuitry configured to:
operate a buffer circuit in a first operating mode or a second operating mode,
wherein operating the buffer circuit in the first operating mode comprises buffering, by a first capacitor of the buffer circuit, power provided by a power source and received by a load,
wherein operating the buffer circuit in the second operating mode comprises:
connecting a second capacitor in series with the first capacitor to form a capacitor series circuit;
supplying power to the load by the capacitor series circuit; and
regulating a first voltage across the capacitor series circuit,
wherein regulating the first voltage comprises transferring charge from the first capacitor to the second capacitor,
wherein the circuitry is further configured to:
monitor an input voltage received by the power source; and
operate the buffer circuit in the second operating mode when the input voltage is zero for longer than a predefined time period.

10. An electronic circuit, comprising:
a buffer circuit comprising a first capacitor and a second capacitor; and
a control circuit configured to operate the buffer circuit in a first operating mode or a second operating mode,
wherein the control circuit is configured to operate the buffer circuit in the first operating mode by buffering, by the first capacitor of the buffer circuit, power provided by a power source and received by a load,
wherein the control circuit is configured to operate the buffer circuit in the second operating mode by connecting the second capacitor of the buffer circuit in series with the first capacitor to form a capacitor series circuit, supplying power to the load by the capacitor series circuit, and regulating a first voltage across the capacitor series circuit,
wherein the control circuit is configured to regulate the first voltage by transferring charge from the first capacitor to the second capacitor,
wherein the control circuit is further configured to monitor an input voltage received by the power source and operate the buffer circuit in the second operating mode when the input voltage is zero for longer than a predefined time period.

11. The electronic circuit of claim 10, further comprising:
the power source and the load.

12. The electronic circuit of claim 10,
wherein the second capacitor of the buffer circuit is connected in parallel with an electronic switch,
wherein the capacitor series circuit is connected between a first circuit node and a second circuit node,
wherein the control circuit is configured to operate the buffer circuit in the first operating mode by switching on the electronic switch, and
wherein the control circuit is configured to operate the buffer circuit in the second operating mode by switching off the electronic switch.

13. The electronic circuit of claim 10,
wherein the control circuit is further configured to operate the buffer circuit in a third operating mode after the second operating mode and before the first operating mode,
wherein the control circuit is configured to operate the buffer circuit in the third operating mode by transferring charge from the second capacitor to the first capacitor.

14. The electronic circuit of claim 13,
wherein the control circuit is further configured to monitor the first voltage and a second voltage across the first capacitor,
wherein the control circuit is configured to operate the buffer circuit in the first operating mode when a difference between the first voltage and the second voltage is lower than a predefined threshold.

15. The electronic circuit of claim 10, further comprising:
a charge transfer circuit coupled to the first capacitor and the second capacitor, the charge transfer circuit including a half-bridge and an inductor,
wherein the control circuit is configured to transfer charge from the first capacitor to the second capacitor using the charge transfer circuit.

16. The electronic circuit of claim 15,
wherein the control circuit is further configured to control the half-bridge dependent on a voltage level of the first voltage.

17. The electronic circuit of claim 15,
wherein the load comprises a DC-DC converter,
wherein the half-bridge is controlled by a controller of the DC-DC converter,
wherein the charge transfer circuit further includes an electronic switch coupled to a tap of the half-bridge and coupled to the inductor, and
wherein the control circuit is further configured to control the electronic switch dependent on a voltage level of the first voltage.

\* \* \* \* \*